US009852167B2

(12) United States Patent
Sahoo

(10) Patent No.: US 9,852,167 B2
(45) Date of Patent: Dec. 26, 2017

(54) EFFICIENT ALLOCATION OF NUMBERS IN A NON-CONTIGUOUS LIST USING GAP VALUES

(71) Applicant: Manas Kumar Sahoo, Paradip Port (IN)

(72) Inventor: Manas Kumar Sahoo, Paradip Port (IN)

(73) Assignee: SAP SE, Walldorf (DE)

( * ) Notice: Subject to any disclaimer, the term of this patent is extended or adjusted under 35 U.S.C. 154(b) by 647 days.

(21) Appl. No.: 14/340,784

(22) Filed: Jul. 25, 2014

(65) Prior Publication Data

US 2016/0026649 A1 Jan. 28, 2016

(51) Int. Cl.
*G06F 17/30* (2006.01)

(52) U.S. Cl.
CPC .. *G06F 17/30321* (2013.01); *G06F 17/30958* (2013.01)

(58) Field of Classification Search
None
See application file for complete search history.

(56) References Cited

U.S. PATENT DOCUMENTS

2002/0107860 A1* 8/2002 Gobeille ........... G06F 17/30961
2010/0076799 A1* 3/2010 Magent ............... G06F 19/3437
705/7.31
2013/0110819 A1* 5/2013 Attaluri ............. G06F 17/30492
707/714
2015/0331884 A1* 11/2015 Dillon ............... G06F 17/30227
707/607

OTHER PUBLICATIONS

Ananiev, Alexander. "A Generic Iterator for Tree Traversal." Dr. Dobb's. UBM Tech, Oct. 31, 2012. Web. Jan. 18, 2017, <https://web.archive.org/web/20121031005124/http://www.drdobbs.com/database/a-generic-iterator-for-tree-traversal/184404325>.*

* cited by examiner

*Primary Examiner* — Aleksandr Kerzhner
*Assistant Examiner* — Eddy Cheung
(74) *Attorney, Agent, or Firm* — Schwegman Lundberg & Woessner, P.A.

(57) ABSTRACT

A method and system for efficient allocation of numbers in a non-contiguous list using gap values are disclosed. A server system receives a request for one or more numbers. The server system loads an original list of previously allocated numbers into an indexed data structure. The server system generates gap values for the original list of previously allocated numbers in the indexed data structure. The server system uses the original list of previously allocated numbers as an initial current number list and determines whether there are one or more available numbers between a lowest number in the current number list and a highest number in the current number list based on the gap value. The server system then transmits one or more identified available numbers to the requesting system.

17 Claims, 18 Drawing Sheets

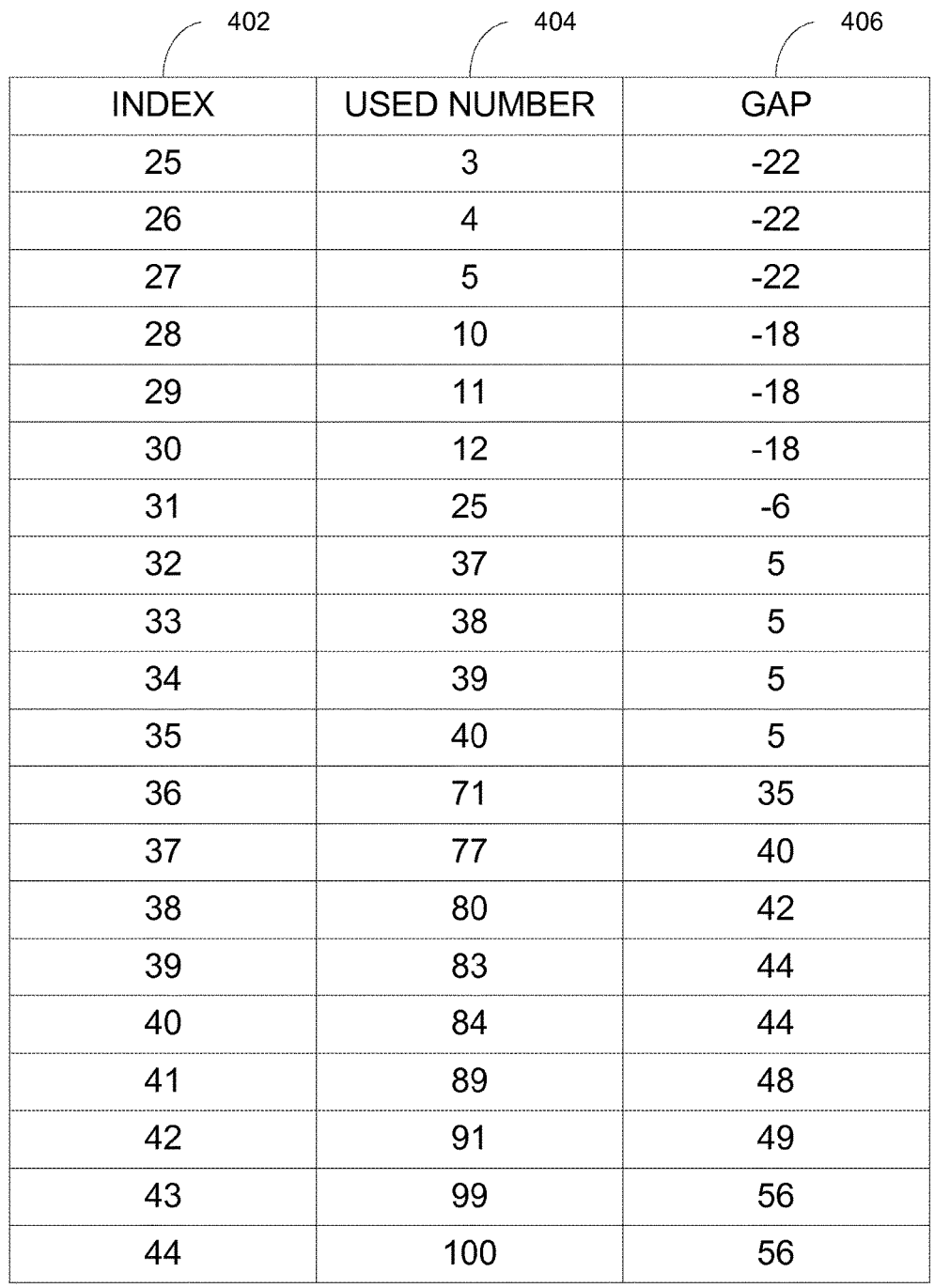
FIGURE 4     400

500

EFFICIENT ALLOCATION OF NUMBERS IN A NON-CONTIGUOUS LIST USING GAP VALUES

TECHNICAL FIELD

The disclosed example embodiments relate generally to the field of data management, and in particular to the field of efficient searching.

BACKGROUND

The rise of the computer age has resulted in increased access to services online. As the cost of electronics and networks drop, many services that were previously provided in person are now provided remotely over the Internet. For example, banking services have increasingly shifted to the online space with customers able to access banking services over a communication network. Similarly, electronic mail (e-mail) has reduced the need for letters to be physically delivered. Instead, messages can be sent over networked systems almost instantly.

Some computer systems supply numbers for various purposes. For example, a computer system can be responsible for generating citizen identification numbers or order identification numbers. In some cases these numbers can be generated in a strictly sequential manner (e.g., each generated number is exactly one integer value greater than the previously generated number). When this is the case, it is relatively easy to store the current position and generate each subsequent number.

However, in some cases the generated numbers are not strictly sequential. In this case, the computer system is unable to quickly determine the next available number that the computer system should allocate. For example, in some cases, some numbers are given out by individual third party vendors who are not connected to the computer system and submitted to the computer system later. In this case, the computer system needs to search the space of potentially available numbers to identify one or more currently available numbers.

BRIEF DESCRIPTION OF THE DRAWINGS

Some example embodiments are illustrated by way of example and not limitation in the Figures of the accompanying drawings, in which:

FIG. 4 depicts a diagram of an indexed table in accordance with some example embodiments.

Like reference numerals refer to the same or similar parts throughout the drawings.

DETAILED DESCRIPTION

Figure 1:
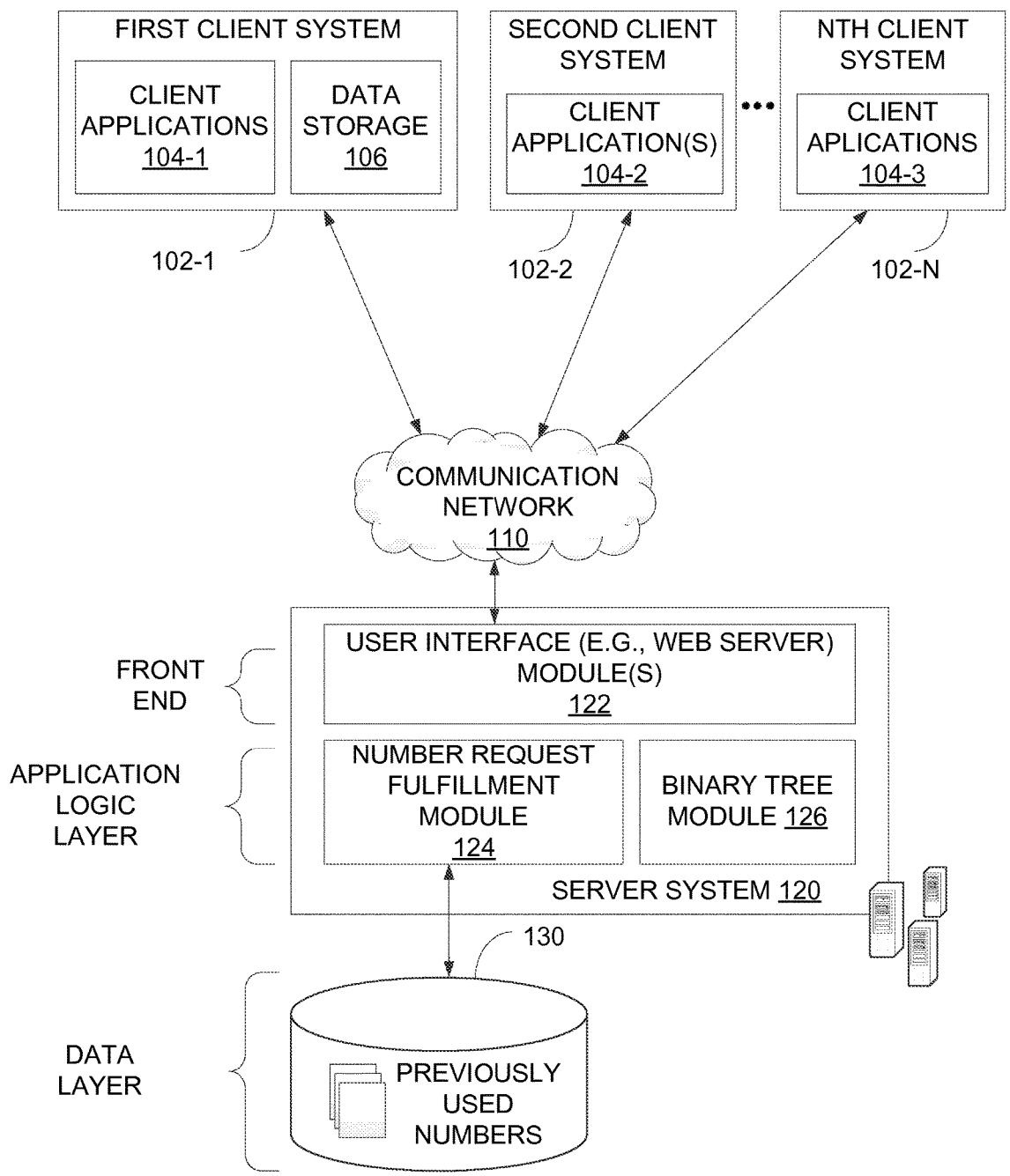
FIG. 1 is a network diagram depicting a client-server system that includes various functional components of a server system in accordance with some embodiments.

The present disclosure describes methods, systems, and computer readable storage mediums storing computer program products for efficiently allocating numbers in a range given a non-contiguous list of pre-allocated numbers within a computer system. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations permutations and combinations of the various features and elements described herein.

To enable a search for available numbers to be performed in a reasonable amount of time, the server system cannot simply count through the entire range of numbers looking for available numbers. Instead, the server system (or other computer system) uses a binary search algorithm that has been modified to use gap values to quickly and efficiently identify available numbers.

In an example embodiment, the server system receives a number allocation request. Each number allocation request includes at least the amount of numbers needed (e.g., a request for five numbers) and the range in which they are to be allocated (e.g., all five numbers need to be between 1000 and 15000).

In response to receiving the request for one or more numbers in a given range, the server system first retrieves a list of all previously allocated numbers in the given range. The server system then loads the retrieved list of previously allocated numbers into an indexed table, wherein each row in the indexed table has an index number and an associated previously allocated number.

The server system then calculates a gap value for each number in the indexed list of previously allocated numbers. The gap value for a respective previously allocated number is the difference between the respective previously allocated number and the index value assigned to that respective previously allocated number. In some example embodiments the server system only calculates actual index values for previously allocated numbers as they are needed. Thus, the indexed list of previously allocated numbers does not include actual gap values for each number. Instead, the server system calculates the actual gap values for a respective previously allocated number when it is needed. In this way, the performance of the server system is improved because it does not unnecessarily calculate gap values for all previously allocated numbers in the original range of requested numbers.

The server system determines whether there are any available numbers between the first previously allocated number and the last previously allocated number. This is accomplished by calculating a predicted gap value and comparing it to the actual gap value for the final previously allocated number. The server system then begins building a binary tree. The server system begins by creating a first node from the original list of previously allocated numbers. The first node represents all the numbers between the first previously allocated number (by numeric value) and the last previously allocated number (also by numeric value).

The server system then determines whether the highest previously allocated number (i.e., the number with the highest numeric value) in the node has an actual gap value equal to the predicted gap value. If the server system determines that the highest previously allocated number in the node has an actual gap value that is not equal to the predicted gap value, the server system then creates two child nodes.

Once the server system has split the original node into two child nodes, the server system begins the available number identification process again with the first child node. For example, an original node is split into two child nodes. The server system then begins analyzing each child node in an attempt to find the available numbers.

Each subsequent iteration of the available number search process includes, for the current node, determining whether there are any available numbers between the lowest number in the node and the highest number in the node. If so, the server system determines whether the current node can be split into two nodes (or the current list can be split into two lists). If so, the server system creates two child nodes and sets the first node to be the new current node. If not, the server system identifies the available numbers in the number range represented by the current node. Those numbers are allocated to respond to the number allocation request from the client system.

FIG. 1 is a network diagram depicting a client-server system 100 that includes various functional components of a server system 120 in accordance with some embodiments. The client-server system 100 includes one or more client systems 102-1 to 102-N and a server system 120. One or more communications networks 110 interconnect these components. The communications network 110 may be any of a variety of network types, including local area networks (LAN), wide area networks (WAN), wireless networks, wired networks, the Internet, personal area networks (PAN), or a combination of such networks.

In some embodiments a client system 102 is an electronic device with one or more processors, such as a personal computer, a smartphone, a tablet, a mobile phone, a laptop, or any other electronic device capable of communication over a communication network 110. FIG. 1 includes multiple client systems 102-1 to 102-N but when discussing a generic client system the specification will use the reference number 102, rather than one of the more specific reference numbers (e.g., 102-1, 102-2, or 102-N). The client system 102 includes one or more client applications 104, which are executed by the respective client system 102. In some embodiments, the client applications 104 include one or more applications from the set consisting of search applications, communication applications, productivity applications, game applications, word processing applications, or any other useful applications.

Client system 102-1 also includes data storage 106. The data storage 106 stores data associated with the client system 102-1 including, but not limited to, user profiles, application data storage, system specification data, request data, and number range assignment data.

A client system 102 transmits number allocation requests to the server system 120. Each number allocation request specifies a specific amount of numbers needed and a range of possible numbers (e.g., the allocated numbers are requested to be within the range of possible numbers). The client system 102 also receives one or more allocated numbers from the server system 120. For example, the client system 102 runs a shipping service and sends a number allocation request to the server system 120 for a specific number of shipping numbers for a specific number of packages. The number allocation request specifies that the client system 102 needs four new numbers in the range of 200-400. The client system 102 then receives four allocated numbers from the server system 120.

In some example embodiments the client system 102 receives a notification from the server system 120 that the specified number range did not include sufficient available numbers to meet the requested amount of numbers. In response, the client system 102 retransmits an additional number range to the server system 120, instructing the server system 120 to automatically allocate additional number range space, or instructing the server system 120 that no additional numbers are needed.

In some embodiments, as shown in FIG. 1, the server system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various embodiments have been omitted from FIG. 1. However, a skilled artisan will readily recognize that various additional functional modules and engines may be used with a server system 120, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the various embodiments are by no means limited to this architecture.

As shown in FIG. 1, the front end consists of a user interface module (e.g., a web server) 122, which receives requests from various client systems 102-1 to 102-N, and communicates appropriate responses to the requesting client systems 102-1 to 102-N. For example, the user interface module(s) 122 may receive requests in the form of Hypertext Transport Protocol (HTTP) requests, or other web-based, application programming interface (API) requests. The client systems 102-1 to 102-N may be executing conventional web browser applications, or applications that have been developed for a specific platform to include any of a wide variety of mobile devices and operating systems.

As shown in FIG. 1, the data layer includes at least one database, the previously allocated numbers database 130. This database 130 is accessed by the applications on the server system 120 as needed to perform their functions. Thus, whenever an application of the server system 120 needs to determine what numbers have previously been allocated, it accesses the previously allocated numbers database 130.

In some embodiments the application logic layer includes various application server modules, including a number request fulfillment module 124 and the binary tree module 126. Individual application server modules are used to implement the functionality associated with various applications, services and features of the server system 120. For instance, a messaging application, such as an email application, an instant messaging application, or some hybrid or variation of the two, may be implemented with one or more application server modules. Similarly, a search engine enabling users to search for and browse member profiles may be implemented with one or more application server modules.

In addition to the various application server modules, the application logic layer includes the number request fulfillment module 124. As illustrated in FIG. 1, with some embodiments the number request fulfillment module 124 is implemented as a service that operates in conjunction with various application server modules. For instance, any number of individual application server modules can invoke the functionality of the number request fulfillment module 124 to include an application server module associated with applications for allowing a user with a client system 102 to request one or more numbers within a specified range. However, with various alternative embodiments, the number request fulfillment module 124 may be implemented as its own application server module such that it operates as a stand-alone application.

With some embodiments, the number request fulfillment module 124 includes or has an associated publicly available application programming interface (API) that enables third-party applications to invoke the functionality of the number request fulfillment module 124.

Generally, the number request fulfillment module 124 receives a number allocation request from one of the client systems 102 through the communication network 110. Each number allocation request requests a certain amount of numbers within a specified range. For example, a number allocation request specifies that the client system 102-1 needs 6 numbers between 10000 and 19999.

Once the number request fulfillment module 124 receives a number allocation request, the number request fulfillment module 124 loads a list of all previously allocated numbers from the previously allocated numbers database 130. For example, if the requested number range is 1000-2999, the number request fulfillment module 124 loads all the previously allocated numbers that are stored in the previously allocated numbers database 130 in that number range.

In some example embodiments the number request fulfillment module 124 then loads all the previously allocated numbers into an indexed table. The indexed table includes the value of the previously allocated number, an associated index value, and a gap value associated with the previously allocated number. For example, the list of previously allocated numbers includes 2, 5, 9, and 11. The numbers are assigned index values from 0 to 3 respectively. In some example embodiments the values associated with the previously allocated numbers are ordered sequentially (from least to greatest) in the indexed table.

The number request fulfillment module 124 then calculates a gap value for each entry in the indexed table. The gap value represents the difference between the value of a number in the indexed table and the index value associated with that number. For example, if the index row stores value 15 at index value 12, the gap value is 3.

The number request fulfillment module 124 also calculates an expected gap value for a particular indexed table. The expected gap value is the difference between first number in the requested number range and the first index value. In some example embodiments the index numbering starts at a number other than 0 (which is the usual first index value in an array or other data structure). For example, if the requested number range is 1 to 100 and the index starts at 13, the expected gap value for the all the previously allocated numbers in the requested number range is −12. Thus, if the previously allocated number list includes all the numbers in the number range, their gap values will be equal to −12.

Number value 1 and index 13 result in a gap value of −12, number value 2 and index 14 result in an gap value of −12, number value 56 and index 68 result in a gap score of −12.

However, if there are available numbers in the requested number range, the gap values associated with the previously allocated numbers will diverge from the expected gap value. For example, a requested number range of 1 to 10, a starting index of 1, and previously allocated number list of all the odd numbers in the requested number range (e.g., 1, 3, 5, 7, and 9) results in the following gap values. The predicted gap value is 1 (the first number in the requested range) subtract 1 (the first index value) which equals 0. The actual gap values for the previously allocated number list are as follows. For value 1 the gap value is 0 (1−1) and is equal to the predicted gap values (e.g., there are no available numbers before 1). For value 3 the gap value is 1 (3−2). This value diverges from the predicted gap value and indicates that there is at least one available number between the first number in the requested number range and three. For value 5, the gap value is 2 (5−3). For value 7, the gap value is 3 (7−4) and for value 9, the gap value is 4 (9−5).

Thus, the number request fulfillment module 124 uses the predicted gap value and the actual gap value to determine whether there are any available numbers in a given range. In some example embodiments the number request fulfillment module 124 compares the predicted gap value to the actual gap value of the first previously allocated number. If the two values do not match, the number request fulfillment module 124 determines that there are available numbers between the start of the requested range and the first previously allocated number. The number request fulfillment module 124 then allocates the available numbers to respond to the number allocation request.

The number request fulfillment module 124 then uses the binary tree module 126 to identify additional available numbers, as needed, to meet the amount of available numbers requested by the client system 102-1. The binary tree module 126 represents the list of previously allocated numbers as a node in a binary tree. Thus, when the number request fulfillment module 124 sends a list of previously allocated numbers to the binary tree module 126, the binary tree module 126 converts that list into a tree node with numbers represented as [first previously allocated number value, last previously allocated number value]. For example, if the numbers in the previously allocated number list go from 3 to 77 and include a plurality of numbers between those two values, the node will be represented as [3, 77]. Also, within the specification nodes or lists can be represented as [first index value of the list, last index value of the list]. So for example, a number list that includes numbers with index values going from 2 to 6, can be represented as [2, 6].

In some example embodiments the binary tree module 126 includes a last in first out (LIFO) queue or a stack, and all newly created nodes are placed in the queue. Thus, when the binary tree module 126 receives a previously allocated number list from the number request fulfillment module 124 and generates a first node, that node is immediately placed in the queue. In some example embodiments more than one node is generated at a time (e.g., when a parent node is split into two child nodes). In this case the node with the higher numeric value is placed on the queue first and is thus the last to be read off the queue. This preserves numeric consistency. For example, node [3, 77] is read off the queue and is being split into two separate nodes. The binary tree module 126 determines a midway point in the number range based on index values associated with the numbers in the node and generates two new child nodes. These child nodes are [3, 37] and [44, 77] respectively. The [44, 77] node has higher numeric values and thus is placed in the queue first and [3, 37] is placed in the queue second.

The binary tree module 126 then begins an iterative process (or a recursive process) to determine the available numbers in the entire requested number range. Each iteration (or recursive step) includes accessing the next node on the queue and setting it as the current node.

In some example embodiments the binary tree module 126 then determines whether there are any available numbers prior to the first previously allocated number in the current node by comparing the gap value for the first previously allocated number in the current node and the gap value for the last previously allocated number in the previous node (e.g., the node that was most recently the current node, before the current node). For example, node B is set as the current node and the server system (e.g., system 120 in FIG. 1) processes to identify available numbers. Once the server system (e.g., system 120 in FIG. 1) finishes processing node B sets node C as the current node. Thus, node C is now the current node and node B is the previous node.

If the two gap values are not equal (the gap value for the first previously allocated number in the current node and the gap value for the last previously allocated number in the previous node), the binary tree module 126 determines that there are available numbers between the first previously allocated number in the current node and the last previously allocated number in the previous node (e.g., the previously allocated number with an index value one integer less than the first previously allocated number in the current node). For example, the entire set of previously allocated numbers includes the values [0, 2, 3, 4, 6, 7, 8, 23, 189], the current node contains previously allocated numbers [6, 8], and the previous node includes previously allocated number [3, 4]. If the binary tree module 126 determines that the gap value for the first previously allocated number in the current node (6) and the gap value for the last previously allocated number in the previous node (4) are not equal, the binary tree module 126 determines that there is at least one available number between 6 (the first previously allocated number in the node) and 4 (which is the last previously allocated number in the previous node).

In some example embodiments the binary tree module 126 then determines whether the gap value for the first number in the current node and the gap value for the last number in the node are equal. In accordance with a determination that the gap value for the first number in the current node and the gap value for the last number in the node are not equal, the binary tree module 126 determines that there is at least one available number between the first previously allocated number in the current node and the last previously allocated number in the current node. For example, using the example list above, a node with the values [0, 4], the binary tree module 126 determines that there is at least one available number between 0 and 4.

The binary tree module 126 then determines whether the current node can be divided into two child nodes. This determination is based on the number of previously allocated numbers represented in the current node. Assuming no child node can have only one previously allocated number, the current node that include at least four previously allocated numbers can be divided into two child nodes.

In some example embodiments the binary tree module 126 determines that the current node cannot be divided into two child nodes. In this case the binary tree module 126 sends the current node (or the numbers listed in the node) to the number request fulfillment module 124.

The number request fulfillment module 124 then identifies one or more of the available numbers in the current node between the first and last previously allocated numbers to use to respond to the number allocation request. If all the available numbers between the first and last previously allocated numbers have been allocated and the number request fulfillment module 124 determines that the number allocation request has not yet been satisfied, the number request fulfillment module 124 then instructs the binary tree module 126 to continue iteratively searching through the nodes to identify additional available numbers.

In some example embodiments the binary tree module 126 determines that the index value for the first previously allocated number is not one less than the index value of the second previously allocated number. The binary tree module 126 then creates two child nodes for the current node. The binary tree module 126 first determines a middle index value between the index value of the first and last previously allocated numbers in the current node. For example, the current node has the values [4, 36] with index values 0 to 10. The binary tree module 126 then determines a middle value of 5. In some example embodiments the binary tree module 126 then creates two child nodes that include previously allocated numbers with index values from 0-5 and 6-10. In other embodiments the binary tree module 126 divides the index values 0-4 and 5-10.

The binary tree module 126 then stores both child nodes on the queue. The child node with the higher index values is stored first, such that it will be read off the queue last. The child node with the lower index values is stored second and will be read off the queue first. The binary tree module 126 then begins the next iteration of the algorithm by reading the next node off the queue and setting it to be the current node.

If the binary tree module 126 reaches the end of the node queue without fulfilling the number allocation order, the number request fulfillment module 124 then determines whether there are any available numbers above the highest previously allocated number in the previously allocated number list. In some example embodiments the number request fulfillment module 124 compares the value of the last previously allocated number and the highest value in the requested number range. For example, the requested number range is 10,000 to 19,999 and the previously allocated number list goes from 10,142 to 19,567. The number request fulfillment module 124 determines the last previously allocated number (19,567) and the highest value in the requested number range (19,999) and thus there are available numbers between the last previously allocated number (19,567) and the highest value in the requested number range (19,999). The number request fulfillment module 124 allocates as many of these numbers as needed to fulfill the number allocation request.

In some example embodiments the number request fulfillment module 124 determines that there are not enough available numbers in the requested number range. In some example embodiments, the number request fulfillment module 124 notifies the requestor that there are not sufficient numbers in the requested range to fulfill the number request. The requesting client can then respond with an additional number range. In other embodiments the number request fulfillment module 124 automatically generates an additional number range and then notifies the requesting client of the updated number range.

Figure 2:
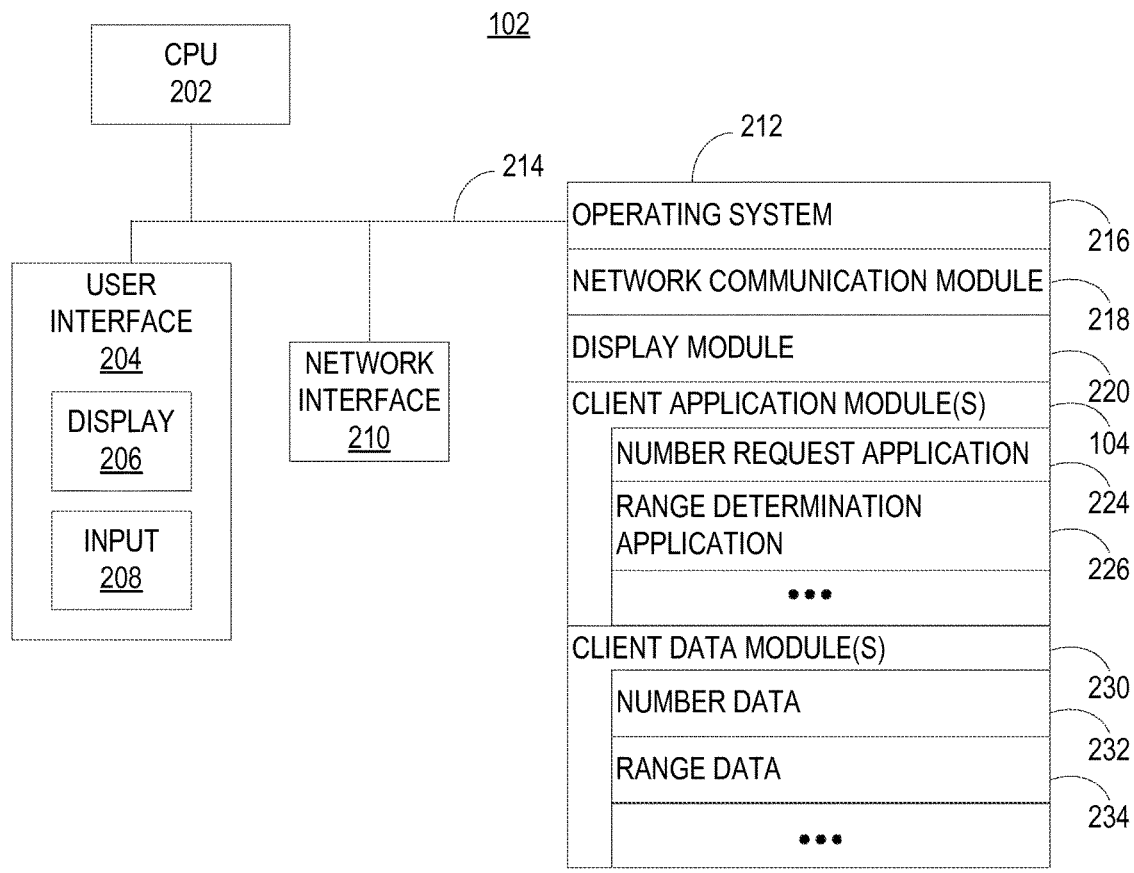
FIG. 2 is a block diagram illustrating a client system in accordance with some example embodiments.

FIG. 2 is a block diagram illustrating a client system 102 in accordance with some example embodiments. The client system 102 typically includes one or more processing units (CPUs) 202, one or more network interfaces 210, memory 212, and one or more communication buses 214 for interconnecting these components.

Memory 212 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

In some example embodiments, memory 212 or the computer readable storage medium of memory 212 stores the following programs, modules and data structures, or a subset thereof:
- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks (e.g., communication network 110 of FIG. 1), such as the Internet, other wide area networks, local area networks, metropolitan area networks, etc.;
- a display module 220 for enabling the information generated by the operating system 216 to be presented visually as needed;
- one or more client applications 104 for handling various aspects of requesting and receiving numbers, including but not limited to:
  - a number request application 224 for requesting one or more numbers from a server system (e.g., system 120 in FIG. 1), wherein each request includes the number of requested numbers and a requested range (e.g., requesting five numbers between 200 and 399);
  - a range determination application 226 for determining the correct range to request based on information available to the client system 102 either through the network interface 210 or from data stored in the range data 234; and
- client system data module(s) 230 for storing data at the client system 102, including but not limited to:
  - number data 232 for storing numbers received from the server system (e.g., system 120 in FIG. 1);
  - range data 234 for storing data about the number ranges associated with the client system 102 (e.g., based on certain number ranges have been associated with the client system 102 or the past history of number allocations.

Figure 3:
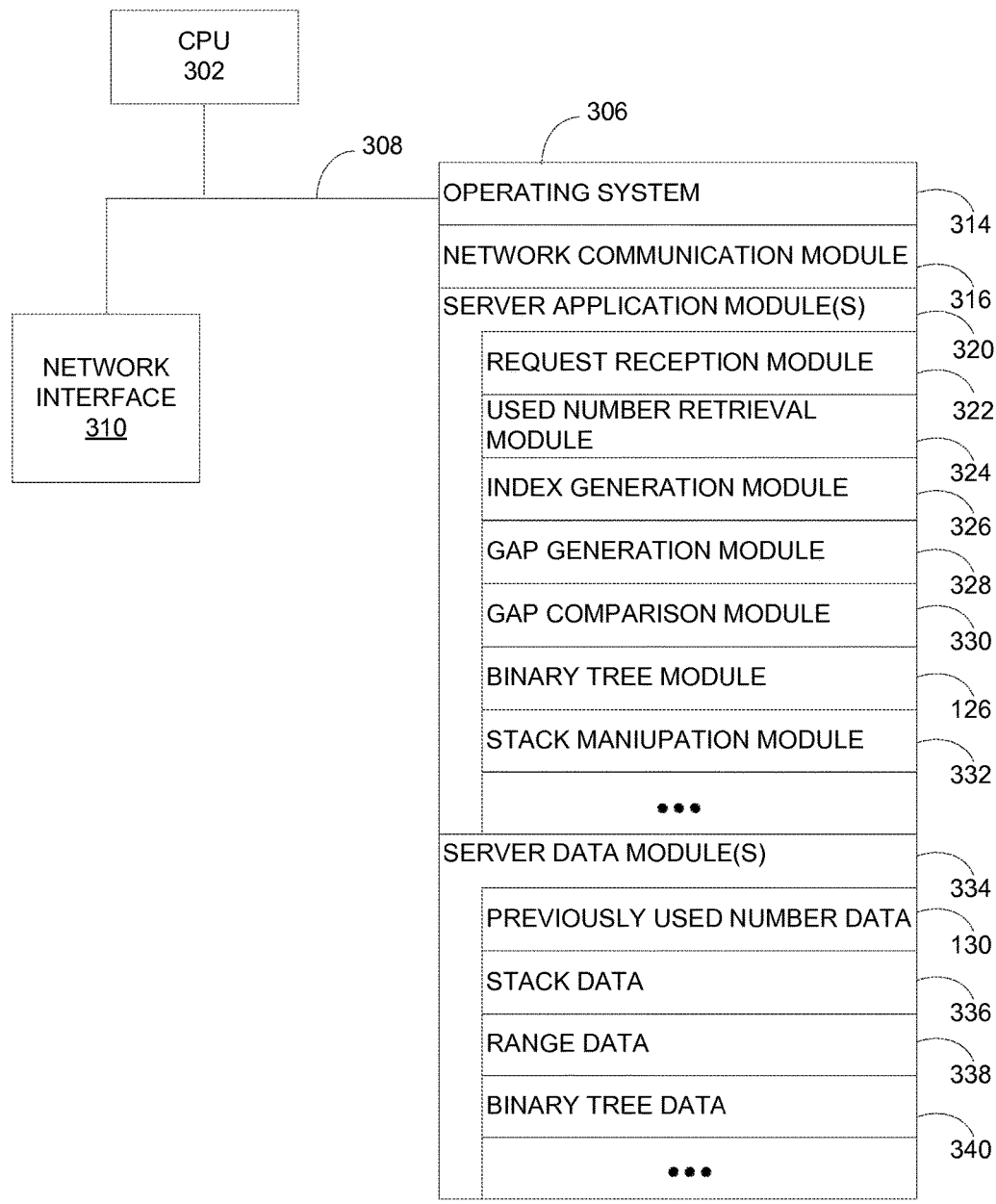
FIG. 3 is a block diagram illustrating a server system in accordance with some embodiments.

FIG. 3 is a block diagram illustrating a server system 120 in accordance with some embodiments. The server system 120 typically includes one or more processing units (CPUs) 302, one or more network interfaces 310, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer readable storage medium. In some embodiments, memory 306 or the computer readable storage medium of memory 306 stores the following programs, modules and data structures, or a subset thereof:
- an operating system 314 that includes procedures for handling various basic system services and for performing hardware dependent tasks;
- a network communication module 316 that is used for connecting the server system 120 to other computers via the one or more communication network interfaces 310 (wired or wireless) and one or more communication networks, such as the Internet, other wide area networks, local area networks, metropolitan area networks, and so on;
- one or more server application modules 320 for performing the services offered by server system 120, including but not limited to:
  - a request reception module 322 for receiving number requests from client systems (e.g., systems 102 in FIG. 1);
  - a used number retrieval module 324 for retrieving a list of previously allocated numbers in given range (e.g., all previously allocated numbers between 5 and 50);
  - an index generation module 326 for generating an index for a list of previously allocated numbers such that each previously allocated number has an associated index value;
  - a gap generation module 328 for computing a gap value for each previously allocated number in the list of previously allocated numbers, wherein the gap value is the difference between the value of the previously allocated number and the associated index value (e.g., if the number 17 had an associated index value of 22, the gap value would be −5);
  - a gap comparison module 330 for comparing the actual gap value for a number with the predicted gap value;
  - a binary tree module 126 for generating and traversing a binary tree of the list of previously allocated numbers; and
  - a stack manipulation module 332 for pushing nodes onto, and popping nodes off of, a stack associated with the binary tree;
- server data module(s) 334, holding data related to server system (e.g., system 120 in FIG. 1), including but not limited to:
  - previously allocated numbers data 130 including a list of one or more numbers that have been previously allocated by the server system (e.g., system 120 in FIG. 1);
  - stack data 336 including one or more nodes in a binary tree;
  - range data 338 for data ranges associated with one or more client systems (e.g., system 102 in FIG. 1) or specific number requests; and
  - binary tree data 340 including data for a binary tree that includes previously allocated numbers.

FIG. 4 depicts a diagram of an indexed table 400 in accordance with some example embodiments. The indexed table 400 includes one or more rows, each row representing a single previously allocated number. Furthermore, each row has a value in one of three columns, the index value 402, the used number value 404, and the gap value 406.

The index value 402 for a particular row is a number associated with a respective previously allocated number and given out in sequential order. The list of previously allocated numbers is sorted by value and then given a sequential index value 402 such that each previously allocated number has an index value 402 one more than the previously allocated number that is directly below it in value and one less than the previously allocated number directly above in value. For example, if the list has values 4, 7, and 10, and value 4 was assigned the index value 402 of 1, then 7 would have an index value 402 of 2, and 10 would have an index value 402 of 3.

In this example indexed table 400, the index values 402 begin at 25, which is assigned to previously allocated number three (the server system (e.g., system 120 in FIG. 1) allocated the index value 402 as needed and may use any method to determine the initial index value 402) and ends with index value 44, which is assigned to previously allocated number 100.

The used number value 404 column represents the numerical value of the previously allocated number associated with that column (e.g., index 30 is associated with the number 12 in this example).

The gap value 406 column represents a gap value for each previously allocated number in the indexed table 400. The gap value 406 is calculated by subtracting the index value 402 for a number from the value of the number itself. For example, the used number 3 has an index value 402 of 25. The gap value 406 is then found by subtracting the index value 402 (25) from the numeric value (3) to give a gap value 406 (−22).

Figure 5A:
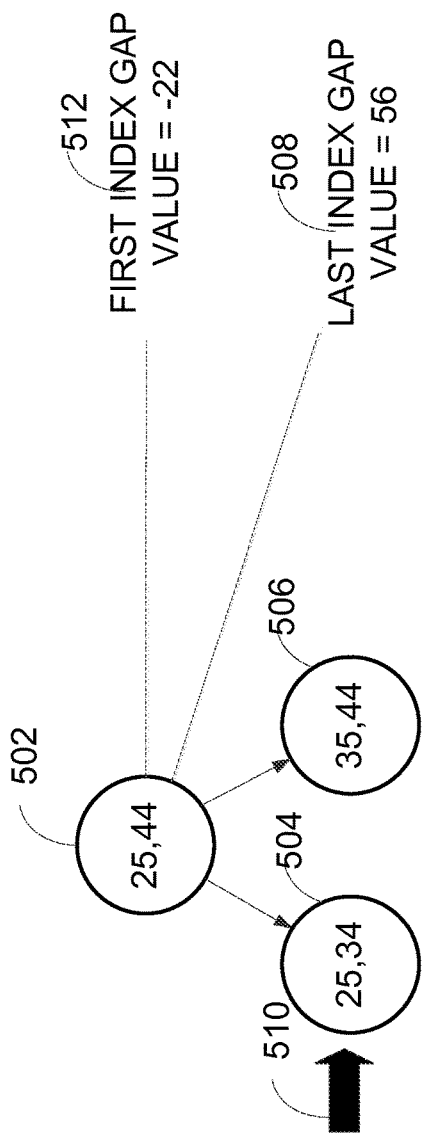
FIGS. 5A-5F depict a diagram of a binary tree in accordance with some example embodiments.

FIG. 5A depicts a diagram of a binary tree 500 in accordance with some example embodiments. The binary tree 500 shown in FIG. 5A uses previously allocated number data the same as or similar to the previously allocated number shown in FIG. 4.

The binary tree 500 consists of a series of nodes 502, 504, and 506. Each node (e.g., 502, 504, and 506) represents a range of index numbers. For example, node 502 represents index values 25 to 44. The server system (e.g., system 120 in FIG. 1) first determines the current gap value for the last index number in the node 502. In this case the current gap value 508 for 44 is 56. This is based on the values in FIG. 4 (index value 44 has a numeric value of 100). This value can be compared against the gap value of the first index value in the node 512. For example, index value 25 has a gap value of −22 (based on the numeric value 3) and index value 44 has a current gap value 508 of 56.

The server system (e.g., system 120 in FIG. 1) determines that the two gap values are not the same. When the server system (e.g., system 120 in FIG. 1) determines that the gap values of the first index value and the last index value are not equal, the server system (e.g., system 120 in FIG. 1) determines that there are one or more available numbers between the numeric values associated with the first index value and the last index number. For example, based on the indexed table 400 in FIG. 4, index value 25 is associated with the numeric value 3 and the index value 44 is associated with the numeric value 100. The server system (e.g., system 120 in FIG. 1) then determines that there is at least one or more available numbers between 3 and 100.

Once the server system (e.g., system 120 in FIG. 1) determines that there are one or more available numbers between the numeric value associated with the first index value and the numeric value associated with the second index value, the server system (e.g., system 120 in FIG. 1) then creates two child nodes for the original node 502.

The binary tree 500 diagram in FIG. 5A also includes a "currently processing arrow" 510 that indicates the node that the server system (e.g., system 120 in FIG. 1) is currently processing.

Figure 5B:
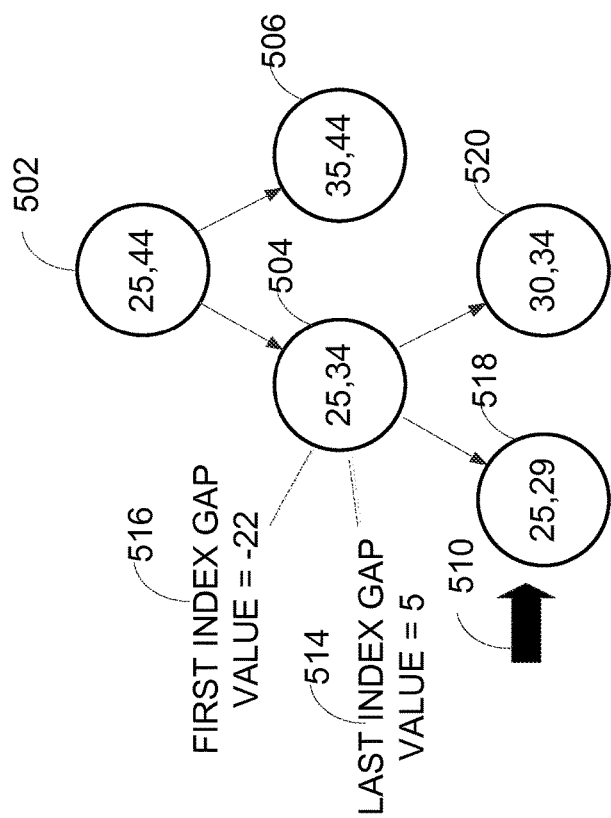

FIG. 5B depicts a diagram of a binary tree 500 in accordance with some example embodiments. The binary tree 500 shown in FIG. 5B uses previously allocated number data the same as or similar to the previously allocated number shown in FIG. 4. FIG. 5B continues the example binary tree 500 shown in FIG. 5A.

The server system (e.g., system 120 in FIG. 1) determines, for the currently processed node 504, that the gap value of the first index value 516 (−22) and the last index value 514 (5) are not equal and thus there are available numbers between the numeric values of the first index value (3) and the last index value (39). The server system (e.g., system 120 in FIG. 1) then creates two child nodes 518, 520 for node 504.

The first child node 518 includes index values 25 to 29. The second child node 520 includes index values 30 to 34. The server system (e.g., system 120 in FIG. 1) also sets the first child node 518 as the currently active processing node. This is reflected by moving the arrow 510 to point to node 518.

Figure 5C:
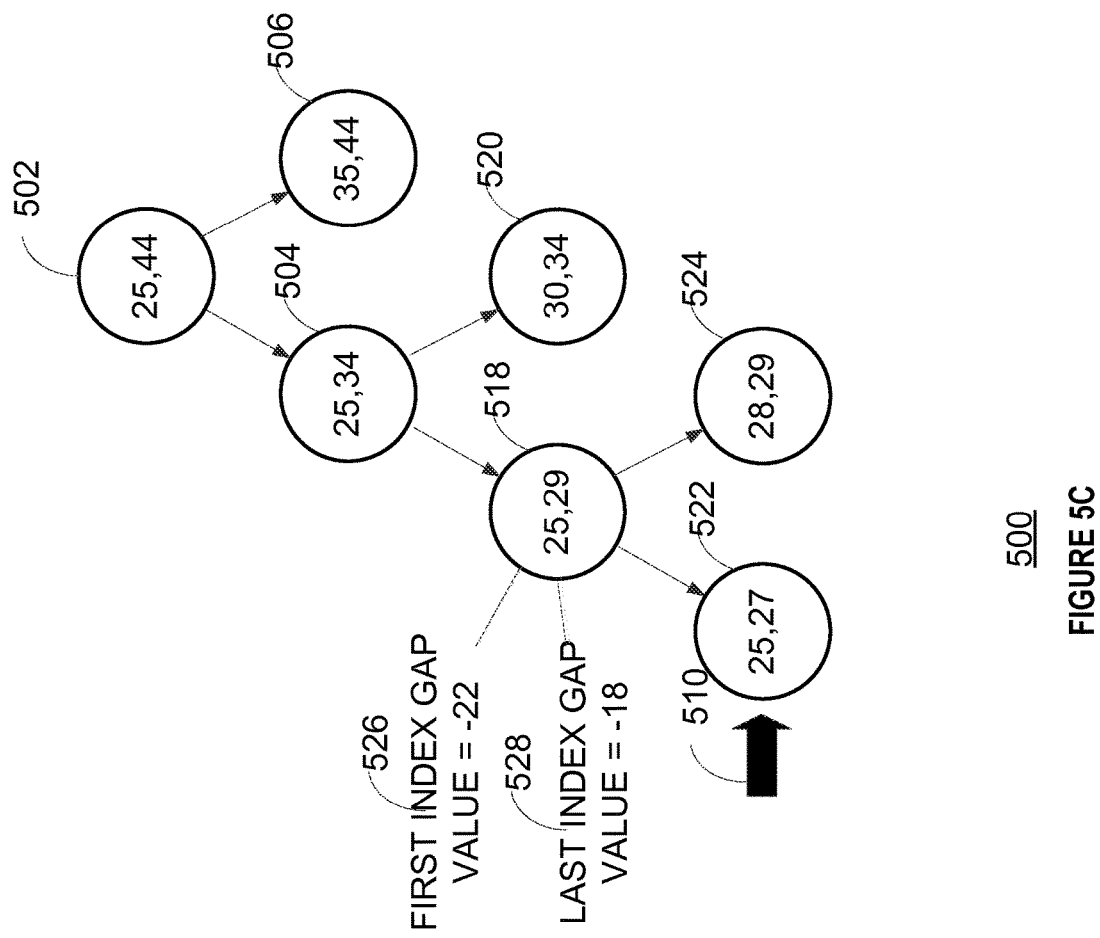

FIG. 5C depicts a diagram of a binary tree 500 in accordance with some example embodiments. The binary tree 500 shown in FIG. 5C uses previously allocated number data the same as or similar to the previously allocated number shown in FIG. 4. FIG. 5C continues the example binary tree 500 shown in FIG. 5B.

The server system (e.g., system 120 in FIG. 1) determines, for the currently processed node 518, that the gap value of the first index value 526 (−22) and the last index value 528 (−18) are not equal and thus there are available numbers between the numeric values of the first index value (3) and the last index value (11). The server system (e.g., system 120 in FIG. 1) then creates two child nodes 522, 524 for node 518.

The first child node 522 includes index values 25 to 27. The second child node 524 includes index values 28 to 29. The server system (e.g., system 120 in FIG. 1) also sets the first child node 522 as the currently active processing node. This is reflected by moving the arrow 510 to point to node 522.

Figure 5D:
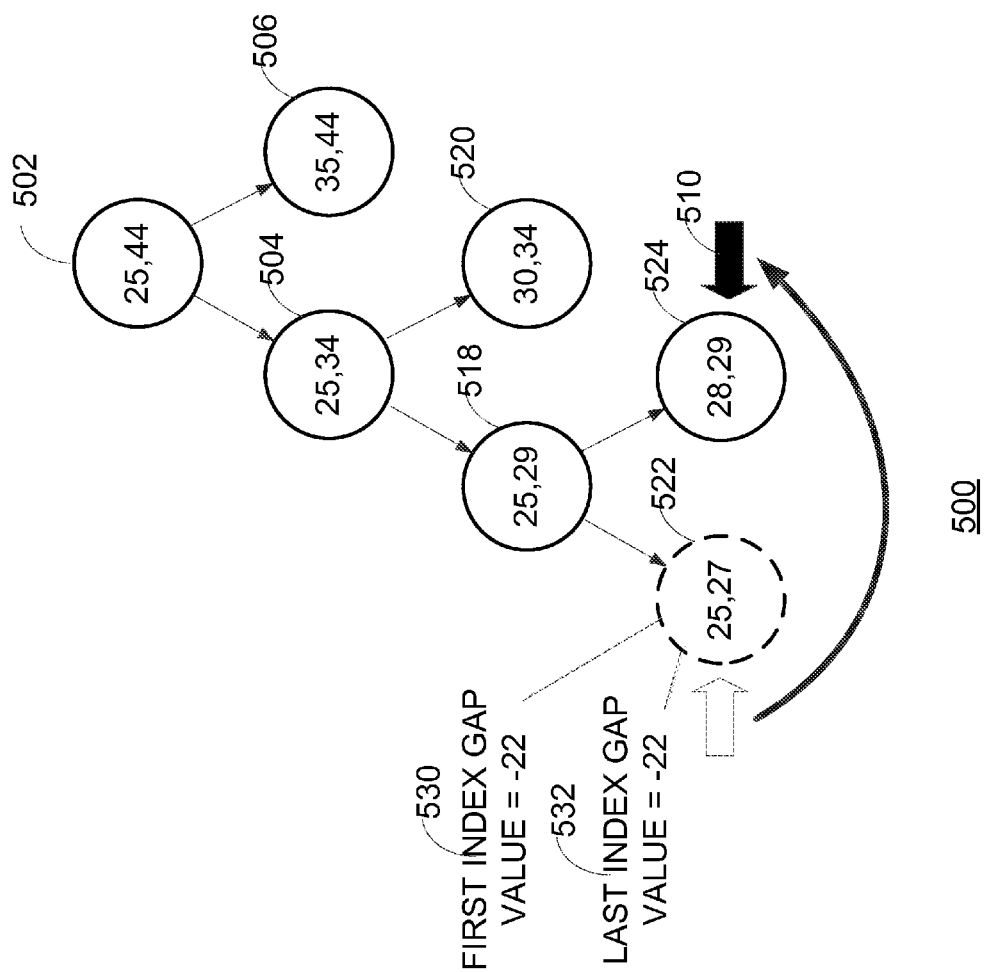

FIG. 5D depicts a diagram of a binary tree 500 in accordance with some example embodiments. The binary tree 500 shown in FIG. 5D uses previously allocated number data the same as or similar to the previously allocated number shown in FIG. 4. FIG. 5D continues the example binary tree 500 shown in FIG. 5C.

The server system (e.g., system 120 in FIG. 1) determines, for the currently processed node 522, that the gap value of the first index value 530 (−22) and the last index value 532 (−22) are equal and thus there are no available numbers between the numeric values of the first index value (3) and the last index value (5). As a result, the server system (e.g., system 120 in FIG. 1) discards node 522 and moves the processing arrow 510 to the next node (based on index value). Thus the server system (e.g., system 120 in FIG. 1) begins processing node 524.

Figure 5E:
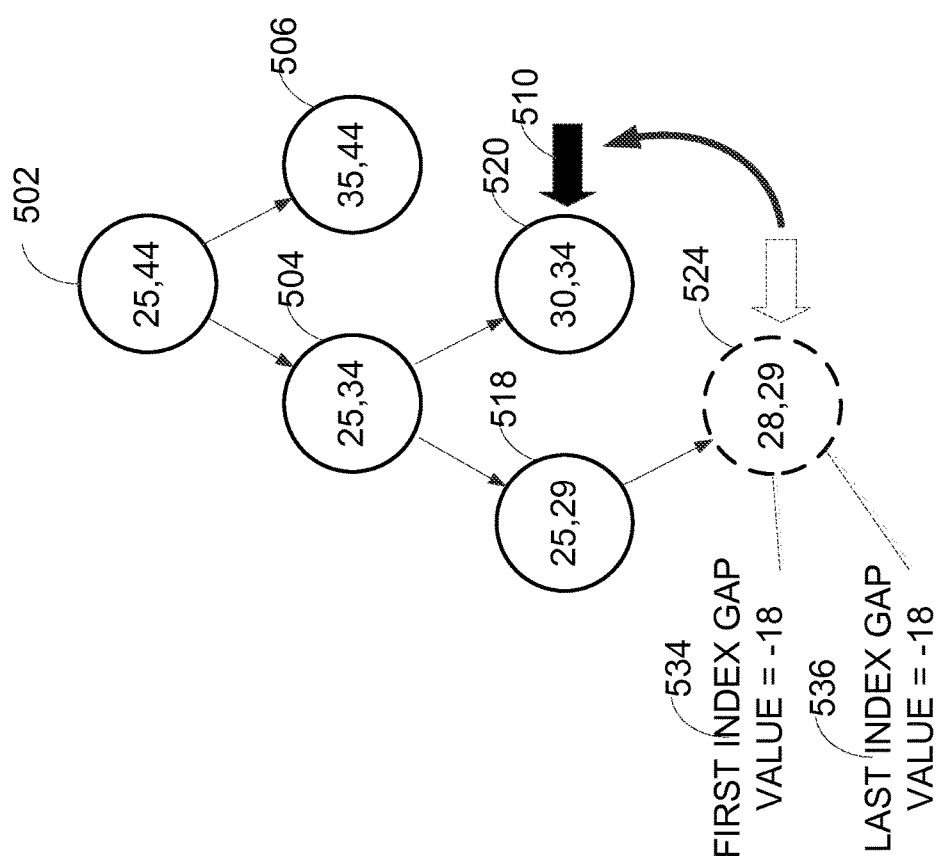

FIG. 5E depicts a diagram of a binary tree 500 in accordance with some example embodiments. The binary tree 500 shown in FIG. 5E uses previously allocated number data the same as or similar to the previously allocated number shown in FIG. 4. FIG. 5E continues the example binary tree 500 shown in FIG. 5D.

When processing a current node, the server system (e.g., system 120 in FIG. 1) first determines whether a gap value for the first index value of the current node is different that the gap value of the last index value of the previous node (e.g., the node that was most recently the current node). If the two gap values are the same, the server system (e.g., system 120 in FIG. 1) determines that there are no available numbers between the number associated with the previous node's last index value and the number associated with the current node's first index value. However, if the two gap values are different, the server system (e.g., system 120 in FIG. 1) determines there are available numbers between the number associated with the previous node's last index value and the number associated with the current node's first index value.

For example, in FIG. 5D, node [28, 29] 524 is the current node and node [25, 27] 522 is the previous node. The gap value of the last index value 532 in the previous node 522 is −22. The gap value of the first index value 534 of the current node (according to the table in FIG. 4) is −18. Thus the server system (e.g., system 120 in FIG. 1) determines that there are at least one available number between the numeric value associated with the last index value of the previous node (e.g., 5 according to the table in FIG. 4) and the numeric value associated with the first index value of the current node (e.g., 10 according to the table in FIG. 4). The server system (e.g., system 120 in FIG. 1) then allocates the available numbers for fulfilling the number request.

However, this determination is not necessary if the first index value of the current node is the same as the first index value of the previous node. Thus, in FIG. 5C, when the current node changed from [25, 29] 522 to [25, 27] (where nodes are represented as [first index value, last index value]) the first index value in both nodes did not change. As such, there was no need to determine whether there are available numbers between the numeric value of the first index value and the numeric value of the last index value. Or, said in another way, when a parent node is the previous node and its child is the current node, there will not be any available numbers between their respective ranges because the child node's range is just a subset of the parent node's range.

In the example shown in FIG. 5E, the allocated numbers between the previous node 522 and the current node 524 are insufficient to meet the requested amount of numbers. As such, the server system (e.g., system 120 in FIG. 1) continues to work through the binary tree 500 to identify additional available numbers.

The server system (e.g., system 120 in FIG. 1) determines, for the current node 524, that the gap value of the first index value 534 (−18) and the last index value 536 (−18) are equal and thus there are no available numbers between the numeric values of the first index value (10) and the last index value (11). As a result, the server system (e.g., system 120 in FIG. 1) discards node 524 and moves the processing arrow 510 to the next node (based on index value). Thus the server system (e.g., system 120 in FIG. 1) begins processing node 520.

Figure 5F:
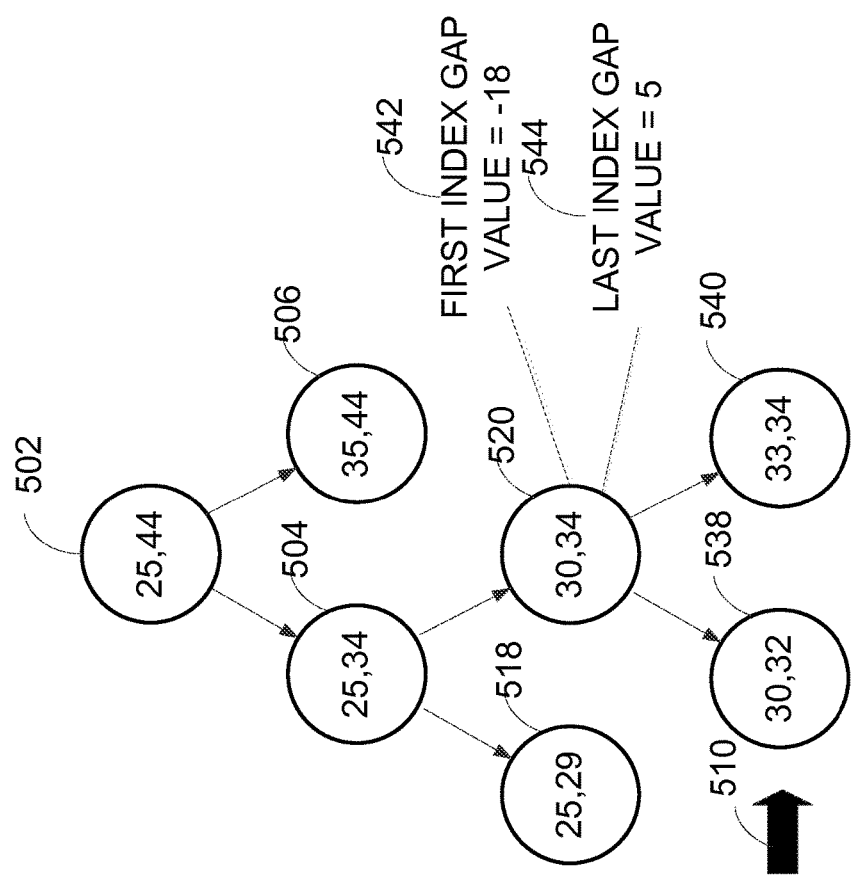

FIG. 5F depicts a diagram of a binary tree 500 in accordance with some example embodiments. The binary tree 500 shown in FIG. 5F uses previously allocated number data the same as or similar to the previously allocated number list shown in FIG. 4. FIG. 5F continues the example binary tree 500 shown in FIG. 5E.

The server system (e.g., system 120 in FIG. 1) determines, for the currently processed node 520, that the gap value of the first index value 542 (−18) and the last index value 544 (5) are not equal and thus there are available numbers between the numeric values of the first index value (12) and the last index value (39). The server system (e.g., system 120 in FIG. 1) then creates two child nodes 538, 540 for node 520.

The first child node 538 includes index values 30 to 32. The second child node 540 includes index values 33 to 34. The server system (e.g., system 120 in FIG. 1) also sets the first child node 538 as the current node (e.g., the node currently processed by the server system 120). This is reflected by moving the arrow 510 to point to node 538. The second child node 540 is placed on the stack to be processed if more available numbers are needed to fulfill the number request.

Though not shown in the figures, the server system 120 can continue to process the binary tree 500 until a sufficient number of numbers have been allocated to meet the original number request from the client system. In some example embodiments the server system (e.g., system 120 in FIG. 1) parses the entire number range through the tree and does not identify enough available numbers to satisfy the number request. In this case the server system (e.g., system 120 in FIG. 1) requests instructions from the requesting client system or notifies the requesting client system that the request could not be fulfilled within the requested number range.

Figure 6:
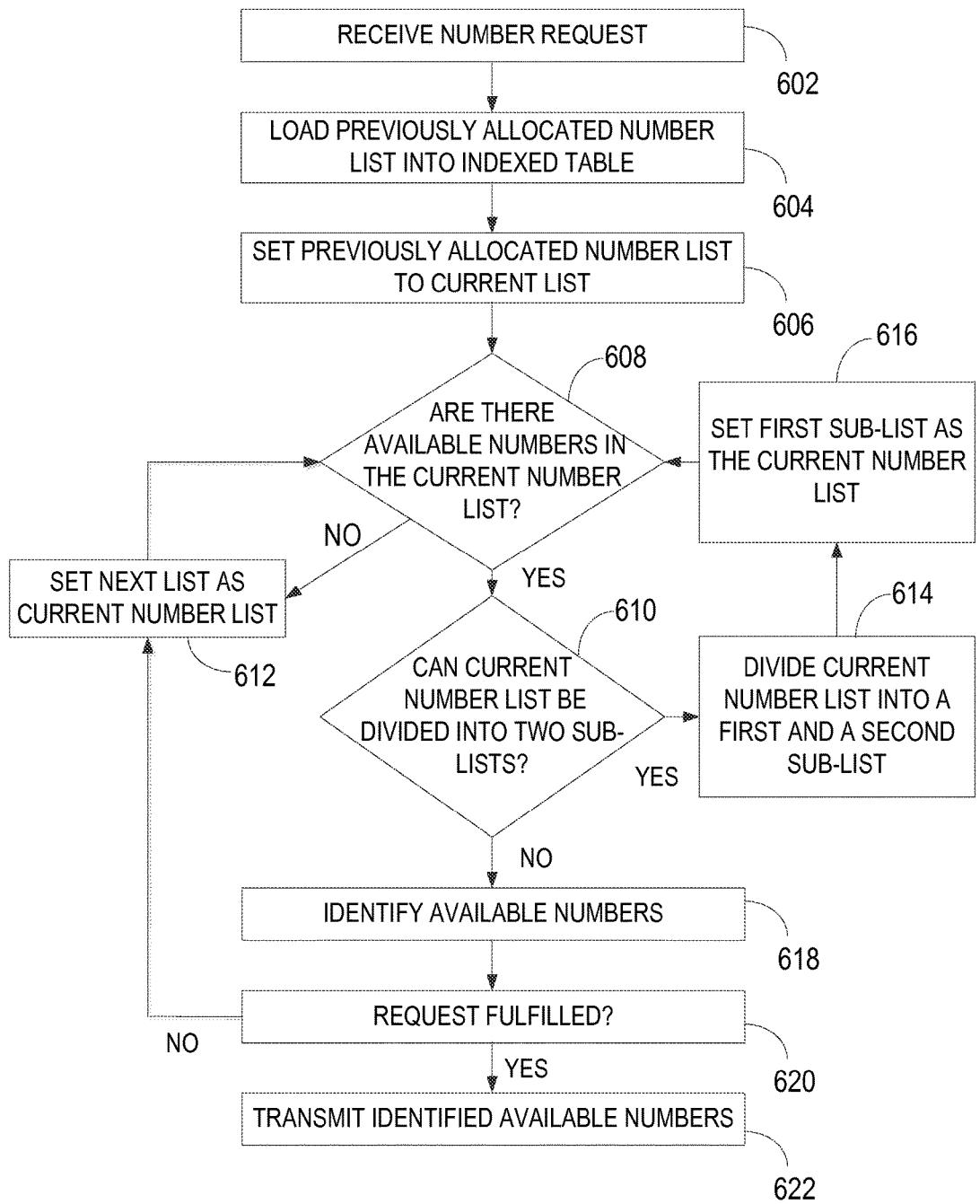
FIG. 6 is a flow diagram illustrating a method for efficiently allocating numbers in a range given a non-contiguous list of pre-allocated numbers within a computer system in accordance with some embodiments.

FIG. 6 is a flow diagram illustrating a method 600 for efficiently allocating numbers in a range given a non-contiguous list of pre-allocated numbers within a computer system in accordance with some embodiments. Each of the operations shown in FIG. 6 may correspond to instructions stored in a computer memory or computer readable storage medium. Optional operations are indicated by dashed lines (e.g., boxes with dashed-line borders). In some embodiments, the method 600 described in FIG. 6 is performed by the server system (e.g., server system 120 in FIG. 1). However, other systems and configurations can be used to implement the method 600.

In some embodiments the method 600 is performed at a server system including one or more processors and memory storing one or more programs for execution by the one or more processors.

The server system (e.g., system 120 in FIG. 1) receives a number request (602) from a client system (e.g., system 102 in FIG. 1). The number request includes a requested amount of numbers and a range from which the numbers are to be drawn. For example, the request specifies that the client wants five numbers between 1 and 250.

The server system (e.g., system 120 in FIG. 1) then loads (604) a list of previously allocated numbers (e.g., numbers that have already been assigned to other requesting users). The list is drawn from the previously allocated numbers that are within the requested number range. For example, if the requested range is 1 to 10, the server system (e.g., system 120 in FIG. 1) loads all the previously allocated numbers between 1 and 10.

The server system (e.g., system 120 in FIG. 1) then sets (606) the previously allocated number list to the current number list. In some example embodiments the current number list is represented as a current node in a binary tree. The server system (e.g., system 120 in FIG. 1) then begins the available number search process with the current number list (e.g., the current node in the binary tree).

The server system (e.g., system 120 in FIG. 1) then determines (608) whether there are any available numbers in the current number list. This determination is made by analyzing the gap values associated with each previously allocated number in the current number list. If there are no available numbers in the current list, the server system (e.g., system 120 in FIG. 1) sets (612) the next list (e.g., pops node off the stack) as the current number list and begins the available number search process on the new current number list.

If the server system (e.g., system 120 in FIG. 1) determines that there are available numbers in the current number list (e.g., there are available numbers between the lowest number in the current number range and the highest number in the current number range) the server system (e.g., system 120 in FIG. 1) then determines (610) whether the current number list can be divided into two sub-lists. In some example embodiments a sub-list cannot have only a single number; thus if the current list only contains 2 or 3 numbers, it cannot be subdivided.

In accordance with a determination that the current list can be divided into two sub-lists, the server system (e.g., system 120 in FIG. 1) divides (614) the current list into a first and second sub-list. Each sub-list contains some, but not all, of the previously allocated numbers in the current number list. In some example embodiments each sub list is represented as a node in a binary tree. In addition, each node may be pushed onto a stack (e.g., or other data structure for storage).

The server system (e.g., system 120 in FIG. 1) then sets (616) the first sub-list as the current sub-list. For example, the server system (e.g., system 120 in FIG. 1) pops the first sub-list off the stack and sets it as the current number list. The server system (e.g., system 120 in FIG. 1) then begins the available number search process again with the new current number list.

In accordance with a determination that the current number list cannot be divided into two sub-lists, the server system (e.g., system 120 in FIG. 1) then identifies (618) one or more available numbers that are within the range of numeric values represented by the current number list. For example, if the current number list is [3, 15], then the available numbers will be found between three and fifteen.

The server system (e.g., system 120 in FIG. 1) then determines (620) whether the identified available numbers are sufficient to fulfill the number request received from the client system (e.g., system 102 in FIG. 1). If the identified available numbers are not sufficient to fulfill the number request, the server system (e.g., system 120 in FIG. 1), the server system (e.g., system 120 in FIG. 1) sets (612) the next list as the current number list and begins the next iteration of the available number search process.

In accordance with a determination that the identified available numbers are sufficient to fulfill the number request received from the client system (e.g., system 102 in FIG. 1), the server system (e.g., system 120 in FIG. 1) then transmits (622) the identified available numbers to the requesting client system (e.g., system 102 in FIG. 1).

Figure 7A:
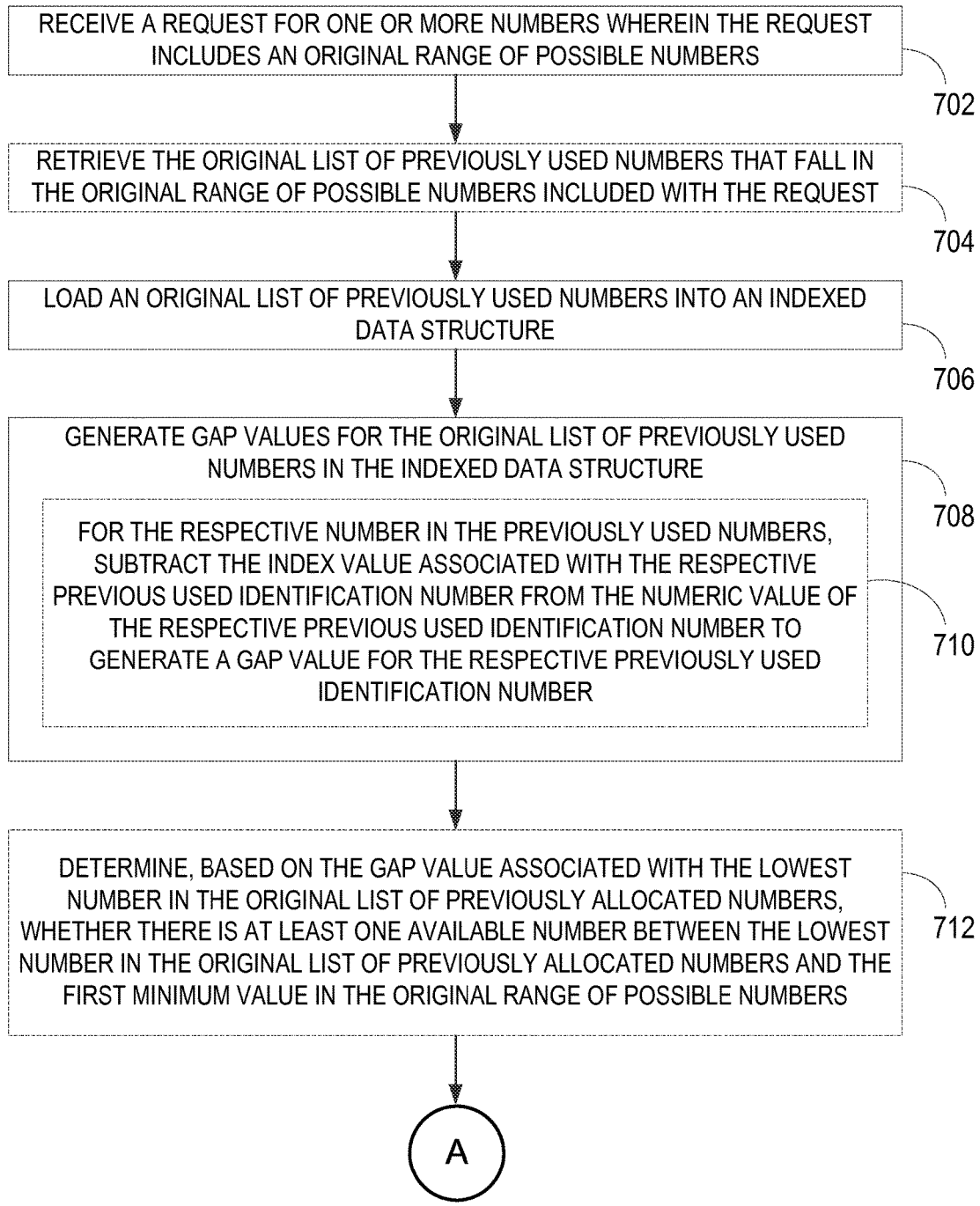
FIGS. 7A-7F are a flow diagram illustrating a method for efficiently allocating numbers in a range given a non-contiguous list of pre-allocated numbers within a computer system in accordance with some embodiments.

FIG. 7A is a flow diagram illustrating a method for efficiently allocating numbers in a range given a non-contiguous list of pre-allocated numbers within a computer system in accordance with some embodiments. Each of the operations shown in FIG. 7A may correspond to instructions stored in a computer memory or computer readable storage medium. Optional operations are indicated by dashed lines (e.g., boxes with dashed-line borders). In some embodiments, the method described in FIG. 7A is performed by the server system (e.g., server system 120 in FIG. 1). However, other systems and configurations can be used to implement the method described in FIG. 7A.

In some embodiments the method is performed at a server including one or more processors and memory storing one or more programs for execution by the one or more processors.

The server system (e.g., system 120 in FIG. 1) receives (702) a request for one or more numbers, wherein the request includes an original range of possible numbers. The request is received from a client system (e.g., system 102 in FIG. 1). In some example embodiments the range indicated is unlimited (e.g., the requestor is willing to accept any available number). In other embodiments the range is determined by the range of numbers assigned to a specific client or group (e.g., client A is allocated all the shipping numbers between 50000 and 59999).

In some example embodiments the original range of numbers includes a first minimum number (e.g., the lowest number in the original range) and a first maximum number (e.g., the highest number in the original range). For example, if the original range is from 1 to 100, the first minimum number is 1 and the first maximum number is 100.

In some example embodiments, prior to loading one or more previously allocated numbers into an indexed data structure, the server system (e.g., system 120 in FIG. 1) retrieves (704) the original list of previously allocated numbers that fall in the original range of possible numbers included with the request. In some example embodiments the list of previously allocated number is stored in a database such as database 130 shown in FIG. 1.

The server system (e.g., system 120 in FIG. 1) then loads (706) an original list of previously allocated numbers into an indexed data structure. For example, the list can be loaded into a table or a spreadsheet that have index numbers. In some example embodiments the original list of previously allocated numbers is sorted by numeric value.

When loaded into the indexed data structure, each previously allocated number has an associated index value. In some example embodiments the index value will begin at 1 and increase. In other embodiments the index value begins at the start of the requested range (e.g., if the requested range was from 25 to 250, the index value would begin at 25.) In yet other embodiments, the index value is chosen based on factors other than the requested range and could be any number (e.g., the index value is part of a larger table and begins at whatever number is open).

The list of previously allocated numbers that the server system (e.g., system 120 in FIG. 1) loads is based on the original range of numbers. For example, if the requested range is 1 to 100, the computer system retrieves a list of all previously allocated numbers greater than 1 and less than or equal to 100. That list contains, for example, the previously allocated numbers 2, 3, 4, 25, 44, 78, 79, and 92.

The server system (e.g., system 120 in FIG. 1) then generates (708) gap values for the original list of previously allocated numbers in the indexed data structure. Gap values are determined based on the index value of the respective previously allocated number and the numeric value of the respective previously allocated number.

More specifically, in some example embodiments the server system (e.g., system 120 in FIG. 1) generates a gap value for a respective previously allocated number by subtracting (710) the index value associated with the respective previously allocated number from the numeric value of the respective previously allocated number to generate a gap value for the respective previously allocated number.

For example, if the previously allocated number is 75 and the associated index value is 34, the gap value is 41. Once gap values have been calculated, the server system (e.g., system 120 in FIG. 1) then begins to determine whether there are any available numbers in the requested range. The server system (e.g., system 120 in FIG. 1) analyzes the first number and its associated gap value.

In some example embodiments, prior to beginning the available number search process, the server system (e.g., system 120 in FIG. 1) determines (712), based on the gap value associated with a previously allocated number with the lowest number in the original list of previously allocated numbers, whether there are one or more available numbers between the lowest number in the original list of previously allocated numbers and the first minimum value in the original range.

To do so, the server system (e.g., system 120 in FIG. 1) determines a predicted gap value. A predicted gap value for the first index value in the original list of previously allocated numbers is the difference between the first index value and the first number in the requested range. For example, if the requested range is between 30 and 400 and the first index value is 55, the predicted gap value for the first index value is 30−55=−25.

The server system (e.g., system 120 in FIG. 1) then compares the actual gap value for the first previously allocated number with the predicted gap value for first previously allocated number. For example, the requested range is 1 to 100, the initial index value is 50, and the numeric value of the first previously allocated number is 6. Based on these values, the predicted gap value is −49 (1−50) and the actual gap value is −44 (6−50). The computer system compares these values and determines that the predicted gap value and the actual gap value are different.

Based on this, the computer system determines that there are one or more available numbers in the range prior to the first previously allocated number (6 in this example). In some example embodiments the server system (e.g., system 120 in FIG. 1) determines the number of available numbers by determining the difference between the predicted gap value and the actual gap value ((−49)−(−44)=−5. A value of −5 indicates 5 available numbers).

Figure 7B:
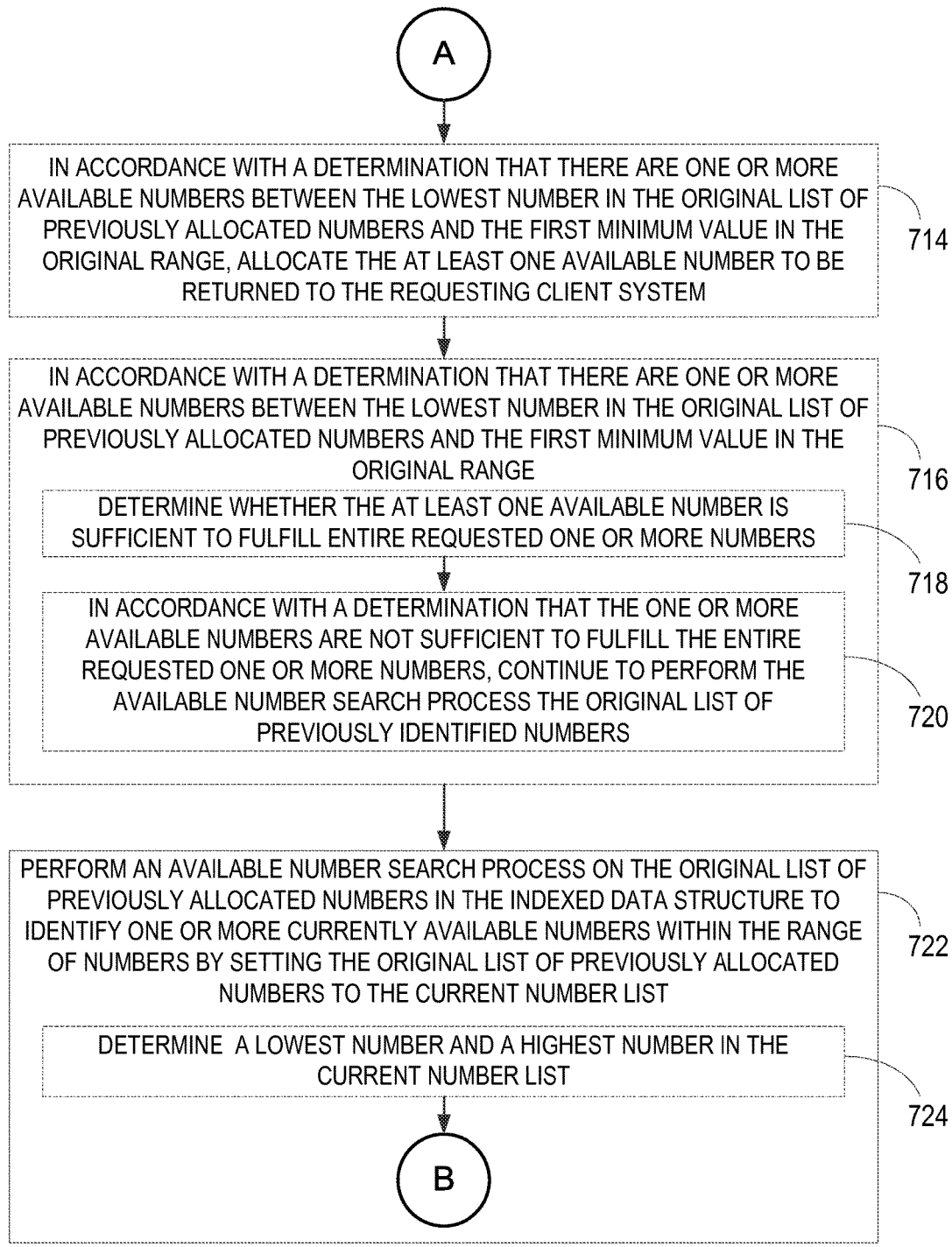

FIG. 7B is a flow diagram illustrating a method for efficiently allocating numbers in a range given a non-contiguous list of pre-allocated numbers within a computer system in accordance with some embodiments. Each of the operations shown in FIG. 7B may correspond to instructions stored in a computer memory or computer readable storage medium. Optional operations are indicated by dashed lines (e.g., boxes with dashed-line borders). In some embodiments, the method described in FIG. 7B is performed by the server system (e.g., server system 120 in FIG. 1). However, other systems and configurations can be used to implement the method described in FIG. 7B.

In some embodiments the method is performed at a server including one or more processors and memory storing one or more programs for execution by the one or more processors.

In accordance with a determination that there are one or more available numbers between the lowest number in the original list of previously allocated numbers and the first minimum value in the original range, the server system (e.g., system 120 in FIG. 1) allocates (714) the at least one available number to be returned to the requesting client system. For example, if there are five available numbers between the first number in the requested range and the first previously allocated number in that range, the server system (e.g., system 120 in FIG. 1) selects one or more of those available numbers and allocates them to be returned to the client system (e.g., system 102 in FIG. 1) that sent the number request. The number of available numbers that server system (e.g., system 120 in FIG. 1) actually selects is based on the amount of numbers that were requested.

In some example embodiments, in accordance with a determination (716) that there are one or more available numbers between the lowest number in the original list of previously allocated numbers and the first minimum value in the original range, the server system (e.g., system 120 in FIG. 1) determines (718) whether the one or more available numbers are sufficient to fulfill all of the requested one or more numbers. The server system (e.g., system 120 in FIG. 1) allocates at least one of the available numbers to be returned to the client system.

For example, if there are five available numbers and the request was for three numbers, the server system (e.g., system 120 in FIG. 1) determines that there is a sufficient amount of available numbers to fulfill the request. The server system (e.g., system 120 in FIG. 1) allocates three of the five available numbers to return to the requesting client system.

In accordance with a determination that the at least one available number is not sufficient to fulfill the entire requested one or more numbers, the server system (e.g., system 120 in FIG. 1) continues (720) to perform the available number search process on the original list of previously identified numbers. For example, if the number request was for six numbers and the server system (e.g., system 120 in FIG. 1) only identified four available numbers between the first number in the range of possible numbers and the lowest number in the list of previously allocated number, the server system (e.g., system 120 in FIG. 1) would determine that there are not sufficient available numbers to fulfill the request. As a result, the server system (e.g., system 120 in FIG. 1) would continue to perform the available number search process on the original list of previously allocated numbers until a sufficient number of available numbers is found.

Thus the server system (e.g., system 120 in FIG. 1) either allocates enough numbers to fulfill the request or, if there are not enough available numbers between the first number in the requested range and the first previously allocated number, the computer system allocates as many as possible (e.g., all the available numbers) and then continues searching for additional available numbers.

The server system (e.g., system 120 in FIG. 1) then performs (722) an available number search process on the original list of previously allocated numbers in the indexed data structure to identify one or more currently available numbers within the range of numbers by setting the original list of previously allocated numbers to the current number list.

In some example embodiments, the server system (e.g., system 120 in FIG. 1) determines (724) a lowest number and a highest number in the current number list, wherein the highest number in the current number list is the previously allocated number with the highest numeric value in the current number list and the lowest number is the previously allocated number with the lowest numeric value in the current number list.

Figure 7C:
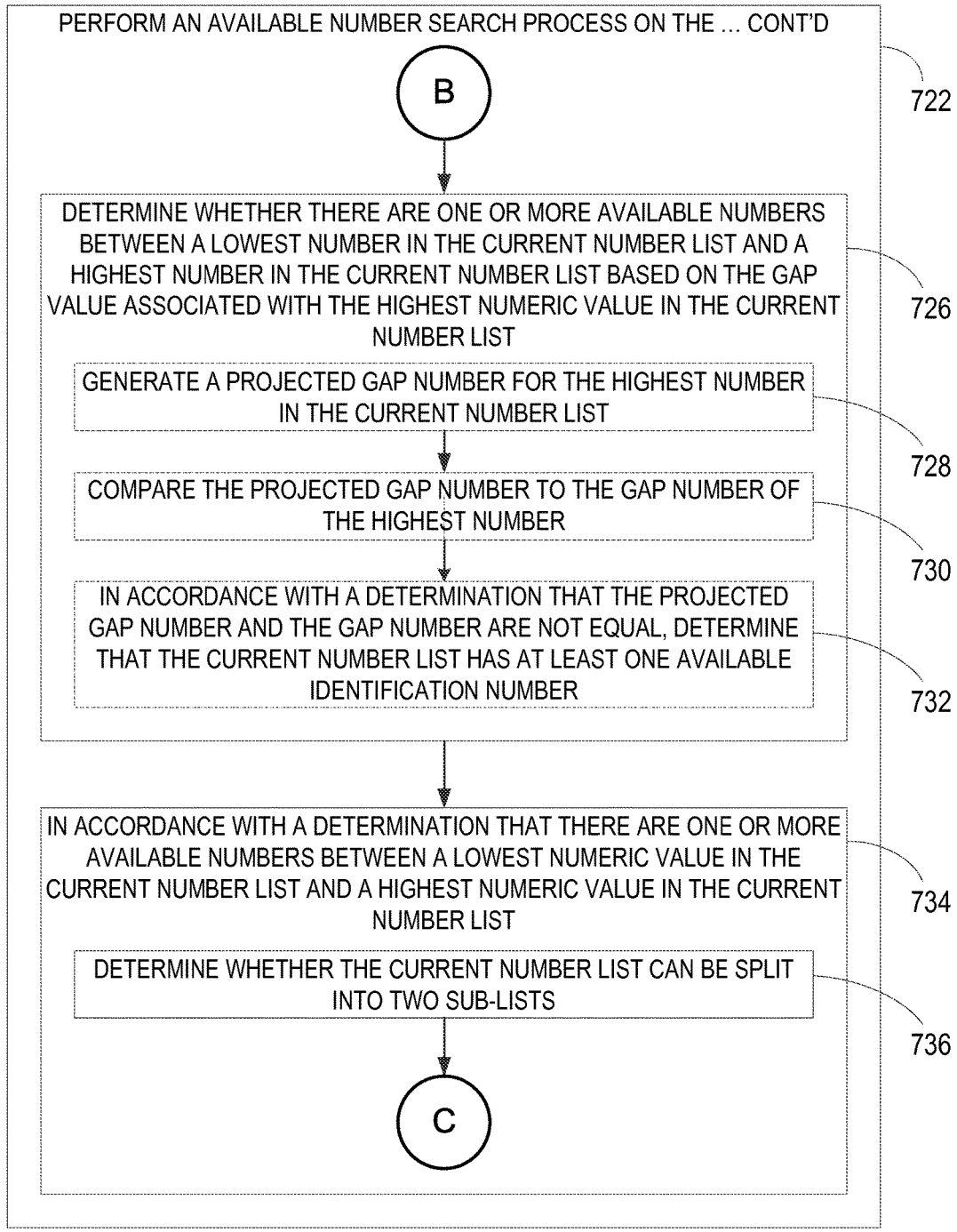

FIG. 7C is a flow diagram illustrating a method for efficiently allocating numbers in a range given a non-contiguous list of pre-allocated numbers within a computer system in accordance with some embodiments. Each of the operations shown in FIG. 7C may correspond to instructions stored in a computer memory or computer readable storage medium. Optional operations are indicated by dashed lines (e.g., boxes with dashed-line borders). In some embodiments, the method described in FIG. 7C is performed by the server system (e.g., server system 120 in FIG. 1). However, other systems and configurations can be used to implement the method described in FIG. 7C.

In some embodiments the method is performed at a server including one or more processors and memory storing one or more programs for execution by the one or more processors.

The server system (e.g., system 120 in FIG. 1) then determines (726) whether there are one or more available numbers between a lowest number in the current number list and a highest number in the current number list based on the gap value associated with the highest numeric value in the current number list.

In some example embodiments, determining whether there are one or more available numbers between a lowest number in the current number list and a highest number in the current number list based on the gap value associated with the highest numeric value in the current number list further includes the server system (e.g., system 120 in FIG. 1) generating (728) a projected gap value for the highest number in the current number list. In some example embodiments the projected gap value for a respective previously allocated number is determined to be the actual gap value of a previously allocated number that precedes the respective previously allocated number. For example, the projected gap value for the highest number in a current number list is the actual gap value of the lowest number in the current number list.

For example, the requested range is 1 to 100, the index numbering system starts at 10, and the final previously allocated number is 78 and has an index value of 66. The actual gap value of the number associated with index value 10 is −5 (e.g., if the numeric value was 5). If there are no gaps in the list of previously allocated numbers between the first previously allocated number (e.g., five) and the final previously allocated number (e.g., 78), the gap value will be the same for both because the index values and the numeric values will both increase at the same rate, leaving the gap value unchanged. However, in this case comparing the predicted gap value (−5) to the actual gap value (68) reveals that the two gap values numbers are not equal. Thus, there exists one or more available numbers between the first previously allocated number and the last previously allocated number in the current number list.

The server system (e.g., system 120 in FIG. 1) then compares (730) the projected gap value to the gap value of the highest number. In accordance with a determination that the projected gap value and the gap value are not equal, the server system (e.g., system 120 in FIG. 1) determines (732) that the current number list has at least one available identification number.

In some example embodiments, the server system (e.g., system 120 in FIG. 1) determines that the last previously allocated number in the node has an actual gap value equal to the predicted gap value. In this case, the server system (e.g., system 120 in FIG. 1) then determines that there are no available numbers between the first previously allocated number in the node and the last previously allocated number in the node. In this case, the server system (e.g., system 120 in FIG. 1) sets the next sub-list to a current number list and begins a new iteration of the available numbers search process.

In accordance with a determination (734) that there are one or more available numbers between a lowest number in the current number list and a highest number in the current number list, the server system (e.g., system 120 in FIG. 1) determines (736) whether the current number list can be split into two sub-lists. A sub list includes more than one number.

As such, any list with more than three numbers can be divided into two sub-lists. For example, a current number list with the numbers 1, 4, 13, and 33 can be split into sub-list 1 with 1 and 4 and sub-list 2 with 13 and 33. In some example embodiments, current number lists with three or fewer numbers cannot be split into sub-lists because at least one of the new sub-lists would have only one number.

Figure 7D:
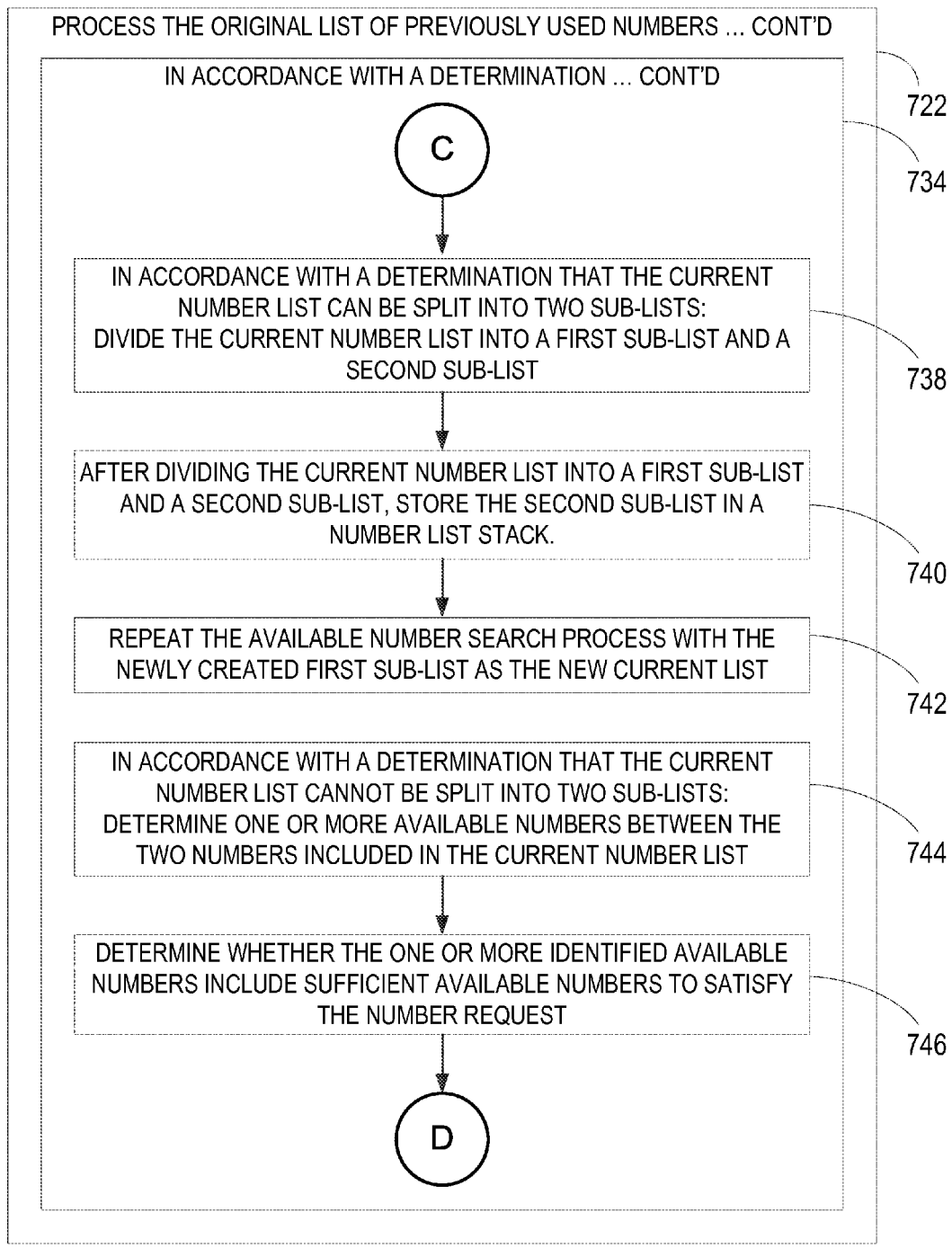

FIG. 7D is a flow diagram illustrating a method for efficiently allocating numbers in a range given a non-contiguous list of pre-allocated numbers within a computer system in accordance with some embodiments. Each of the operations shown in FIG. 7D may correspond to instructions stored in a computer memory or computer readable storage medium. Optional operations are indicated by dashed lines (e.g., boxes with dashed-line borders). In some embodiments, the method described in FIG. 7D is performed by the server system (e.g., server system 120 in FIG. 1). However, other systems and configurations can be used to implement the method described in FIG. 7D.

In some embodiments the method is performed at a server including one or more processors and memory storing one or more programs for execution by the one or more processors.

In accordance with a determination that the current number list can be split into two sub-lists, the server system (e.g., system 120 in FIG. 1) divides (738) the current number list into a first sub-list and a second sub-list.

The first sub-list includes a range of numbers including a lowest number that matches the lowest number of the current number list and a highest number that is associated with a middle index value of the current number list. In some example embodiments the highest value of the first sub-list is one less than the halfway index value of the current number list. For example, if the current number list is (2, 37) with index numbers of 5 and 17 respectively, the first sub-list is (2, 22) wherein the number is associated with index value 11 (which is halfway between 5 and 17). If the index numbers were 5 and 18, the halfway index value would be 11.5. As such the first sub-list would have numbers from index 5 to index 11 or index 12.

Similarly, the second sub-list includes a range of numbers including a lowest number that is equal or greater to the number associated with the halfway index value of the current number list and the highest number is equal to the highest number of the current number list. For example, if the current number list includes (2, 37) with index numbers of 5 and 17 respectively, the second sub-list is (23, 37) wherein the last number is associated with index value 12 (which is halfway between 5 and 17). If the index numbers were 5 and 18, the halfway index value would be 11.5. As such the second child node would have numbers from index 11 or 12 to index 17.

Thus the server system (e.g., system 120 in FIG. 1) divides the current number lists such that a first sub-list low value number is equal to a low value number for the current number list, a first sub-list high value number is less than a high value number for the current number list, a second sub-list low value number is higher than the first sub-list high value number, and the second sub-list high value number is equal to the current high value number. In some example embodiments the first sub-list and the second sub-list divide the current number list such that both the first sub-list and the second sub-list include approximately the same amount of previously allocated numbers from the current number list. In this way the binary tree (i.e., binary tree 500) stays balanced.

After dividing the current number list into a first sub-list and a second sub-list the server system (e.g., system 120 in FIG. 1) stores (740) the second sub-list in a number list stack. It should be noted that any data structure can be used to store sub-lists that are not currently being processed by the server system (e.g., system 120 in FIG. 1). Possible data structures include queues, stacks, binary search trees, lists, and any other suitable data structure.

Further, in accordance with a determination that the current number list can be split into two sub-lists, the server system (e.g., system 120 in FIG. 1) sets the first sub-list as the current sub-list repeats (742) the available number search process with the new current number list.

In accordance with a determination that the current number list cannot be split into two sub-lists, identifies (744) one or more available numbers between the two numbers included in the current number list. For example, the server system (e.g., system 120 in FIG. 1) steps through the number range represented by the current number list starting at the lowest number in the current number list and continuing to the highest number in the current number list. In some example embodiments the server system (e.g., system 120 in FIG. 1) stops stepping through the current number list once enough available numbers have been found to satisfy a number request.

The server system (e.g., system 120 in FIG. 1) determines (746) whether the one or more identified available numbers include sufficient available numbers to satisfy the number request.

Figure 7E:
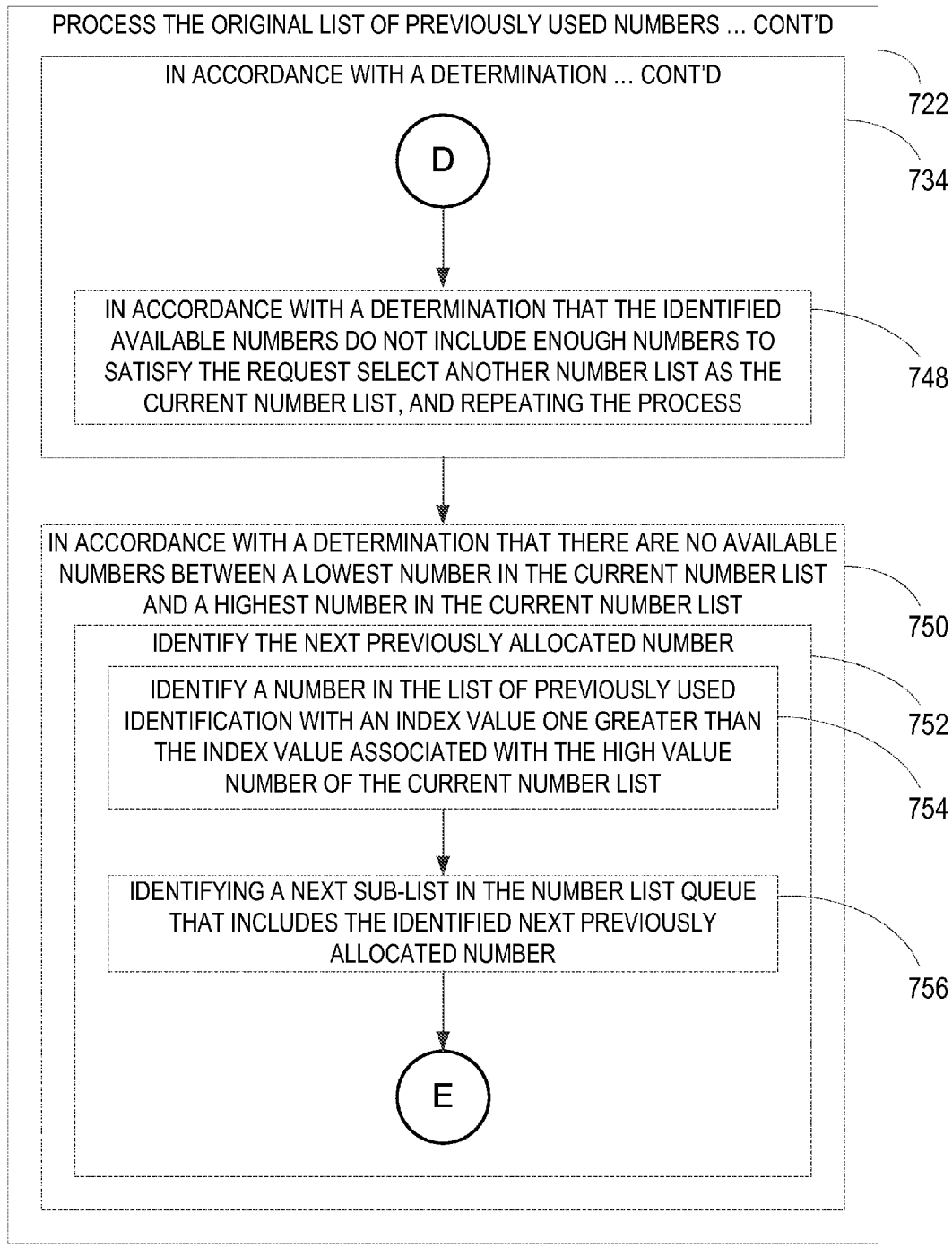

FIG. 7E is a flow diagram illustrating a method for efficiently allocating numbers in a range given a non-contiguous list of pre-allocated numbers within a computer system in accordance with some embodiments. Each of the operations shown in FIG. 7E may correspond to instructions stored in a computer memory or computer readable storage medium. Optional operations are indicated by dashed lines (e.g., boxes with dashed-line borders). In some embodiments, the method described in FIG. 7E is performed by the server system (e.g., server system 120 in FIG. 1). However, other systems and configurations can be used to implement the method described in FIG. 7E.

In some embodiments the method is performed at a server including one or more processors and memory storing one or more programs for execution by the one or more processors.

In accordance with a determination that the identified available numbers do not include enough numbers to satisfy the request, the server system (e.g., system 120 in FIG. 1) selects (748) another number list as the current number list and repeats the available number search process with the new current number list.

In accordance with a determination that there are no available numbers between a lowest number in the current number list and a highest number in the current number list (750), the server system (e.g., system 120 in FIG. 1) identifies (752) the next previously allocated number. Identifying the next previously allocated number further includes the server system (e.g., system 120 in FIG. 1) identifying (754) a number in the list of previously allocated numbers with an index value one greater than the index value associated with the high value number of the current number list. For example, if the current number list has a high value number of 43 with an index value of 22, the next previously allocated number will be the number with an index value of 23.

In some example embodiments the server system (e.g., system 120 in FIG. 1) identifies (756) a next sub-list in the number list queue that includes the identified next previously allocated number. In some example embodiments the server system (e.g., system 120 in FIG. 1) determines the next sub-list by popping the next sub-list off the stack. As long as the server system (e.g., system 120 in FIG. 1) pushes sub-lists (or nodes) onto the stack correctly, the next sub-list to pop off the stack is guaranteed to be the appropriate next sub-list.

In some example embodiments the server system (e.g., system 120 in FIG. 1) stores each sub-list as a node in a binary tree. The server system (e.g., system 120 in FIG. 1) then identifies the next node in the binary tree by identifying a first index value associated with the last previously allocated number in the current node. The server system (e.g., system 120 in FIG. 1) then identifies the next index number (e.g., adds one to the first index value). For example, if the current node is [22, 29] with index values of 19 and 20 respectively, the server system (e.g., system 120 in FIG. 1) then identifies the first index value as 20 (the index value of the last previously allocated number) and adds one to that value to identify a next index number of 21.

The server system (e.g., system 120 in FIG. 1) then identifies the node that includes the index number of 21 as the index value of its first previously allocated number. So, continuing the above example, the server system (e.g., system 120 in FIG. 1) determines that the next index value is 21. As such, the server system (e.g., system 120 in FIG. 1) examines all other current nodes. Current nodes include a [1, 100] node with index values of 1 and 40 respectively, a [50, 100] node with index values of 30 and 40 respectively, a [33, 49] node with index values of 23 and 29 respectively, and a [31, 32] node with index values of 21 and 22 respectively. Based on this list of nodes, the server system (e.g., system 120 in FIG. 1) selects the [31, 32] node because the index value of the first previously allocated number (31) is 21, which matches the next index value identified by the server system (e.g., system 120 in FIG. 1).

In other embodiments, the server system (e.g., system 120 in FIG. 1) maintains a queue of nodes and finding the next node involves popping the top node off the queue when the queue is operated in a lasts in first out (LIFO) mode. Nodes are added to the queue whenever new child nodes are being created. The first node is set as the current node and the second node is pushed on the queue for later use. For example, the server system (e.g., system 120 in FIG. 1) needs to create two child nodes for a parent node [2, 78]. The server system (e.g., system 120 in FIG. 1) creates two child nodes. The first child node is [2, 45] and has index values of 1 and 19 respectively. The second child node is [49, 78] with index values of 20 and 39 respectively. The first node is set as the current node. The second node is then pushed onto the queue. As a result the queue now includes {[49, 78], [79, 154], [162, 299]}. When the server system (e.g., system 120 in FIG. 1) has processed the first child node and determines that more available numbers are needed, it pops [49, 78] off the queue. Because of the manner in which nodes are placed on the queue, the next node on the queue is guaranteed to be the correct next node.

When the server system (e.g., system 120 in FIG. 1) fails to identify a next node (e.g., there are no more nodes on the queue) the server system (e.g., system 120 in FIG. 1) determines that it has reached the end of the list of previously allocated numbers. However, there may still be available numbers between the value of the last previously allocated number and the upper limited of the requested number range. For example, if the value of the last previously allocated number is 97 and the end of the requested number range is 100, the server system (e.g., system 120 in FIG. 1) determines that there are additional available numbers in the requested number range. The server system (e.g., system 120 in FIG. 1) then determines the available numbers between the last previously allocated number and the upper limit of the requested number range.

In some example embodiments the server system (e.g., system 120 in FIG. 1) determines that there are not enough available numbers in the requested number range. In some example embodiments, the server system (e.g., system 120 in FIG. 1) notifies the requestor that there are not sufficient numbers in the requested range to fulfill the number request. The requesting client can then respond with an additional number range. In other embodiments the server system (e.g., system 120 in FIG. 1) automatically generates an additional number range and then notifies the requesting client of the updated number range.

Figure 7F:
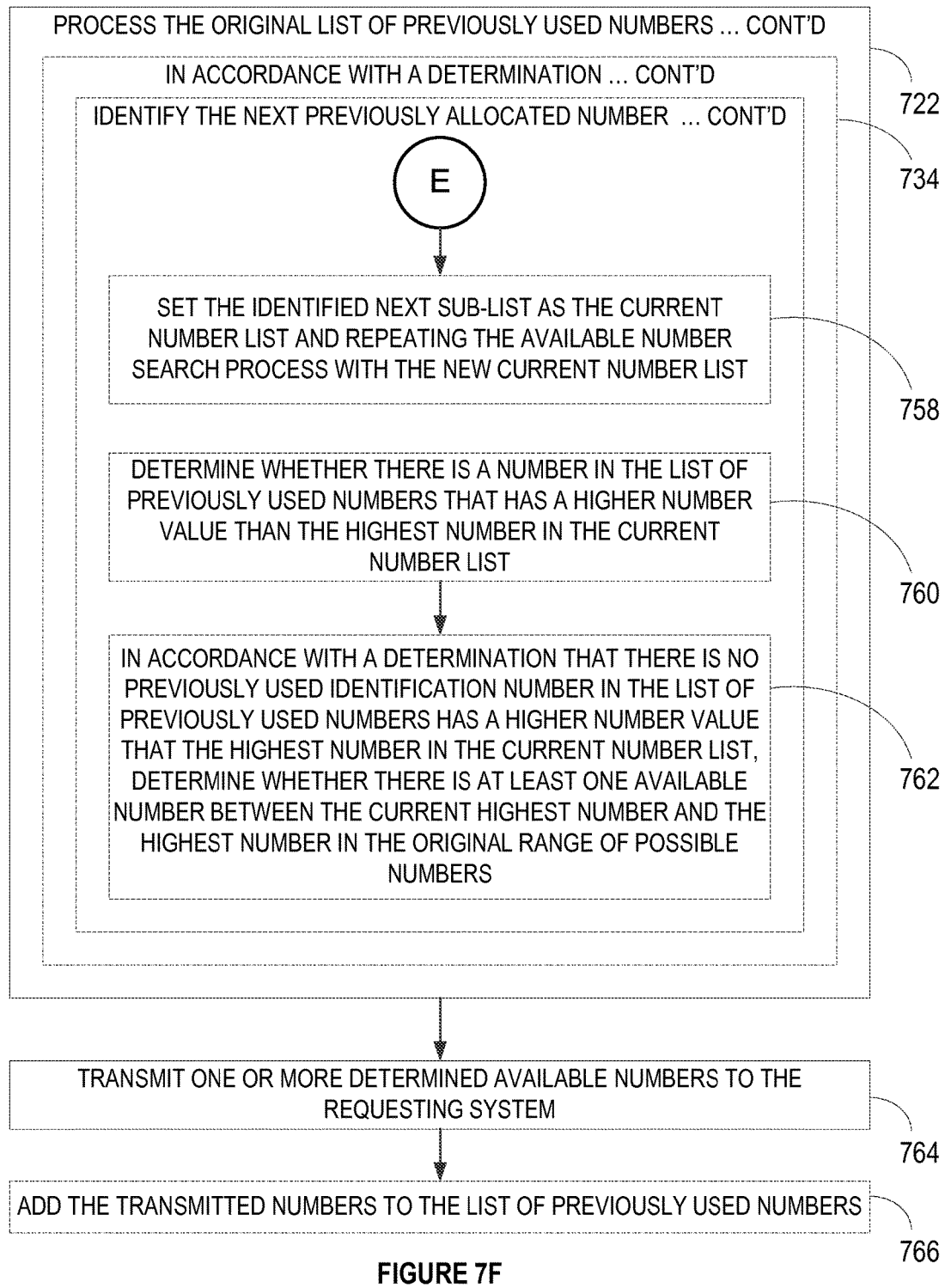

FIG. 7F is a flow diagram illustrating a method for efficiently allocating numbers in a range given a non-contiguous list of pre-allocated numbers within a computer system in accordance with some embodiments. Each of the operations shown in FIG. 7F may correspond to instructions stored in a computer memory or computer readable storage medium. Optional operations are indicated by dashed lines (e.g., boxes with dashed-line borders). In some embodiments, the method described in FIG. 7F is performed by the server system (e.g., server system 120 in FIG. 1). However, other systems and configurations can be used to implement the method described in FIG. 7F.

In some embodiments the method is performed at a server including one or more processors and memory storing one or more programs for execution by the one or more processors.

The server system (e.g., system 120 in FIG. 1) sets (758) the identified next sub-list as the current number list and repeats the available number search process with the new current number list.

In some example embodiments the server system (e.g., system 120 in FIG. 1) determines (760) whether there is a number in the list of previously allocated numbers that has a higher number value than the highest number in the current number list. In accordance with a determination that there is no previously allocated number in the list of previously allocated numbers that has a higher number value that the highest number in the current number list, the server system (e.g., system 120 in FIG. 1) determines (762) whether there is at least one available number between the current highest number and the highest number in the original range of possible numbers.

For example, once a current number list has been fully processed (e.g., all the available numbers in its range are already allocated), the server system (e.g., system 120 in FIG. 1) determines whether there are any previously allocated numbers above that current number list in the list of previously allocated numbers. If current number list is 35 to 66, the server system (e.g., system 120 in FIG. 1) determines whether there is a number greater than 66 in the list of previously allocated numbers. If there are no previously allocated numbers with a higher numeric value, the server system (e.g., system 120 in FIG. 1) then determines whether there are any remaining available numbers between the highest number in the list previously allocated numbers and the highest number in the original range of possible numbers.

The server system (e.g., system 120 in FIG. 1) transmits (764) one or more determined available numbers to the requesting system. The server system (e.g., system 120 in FIG. 1) adds (766) the transmitted numbers to the list of previously allocated numbers.

Example Machine Architecture and Machine-Readable Medium

Figure 8:
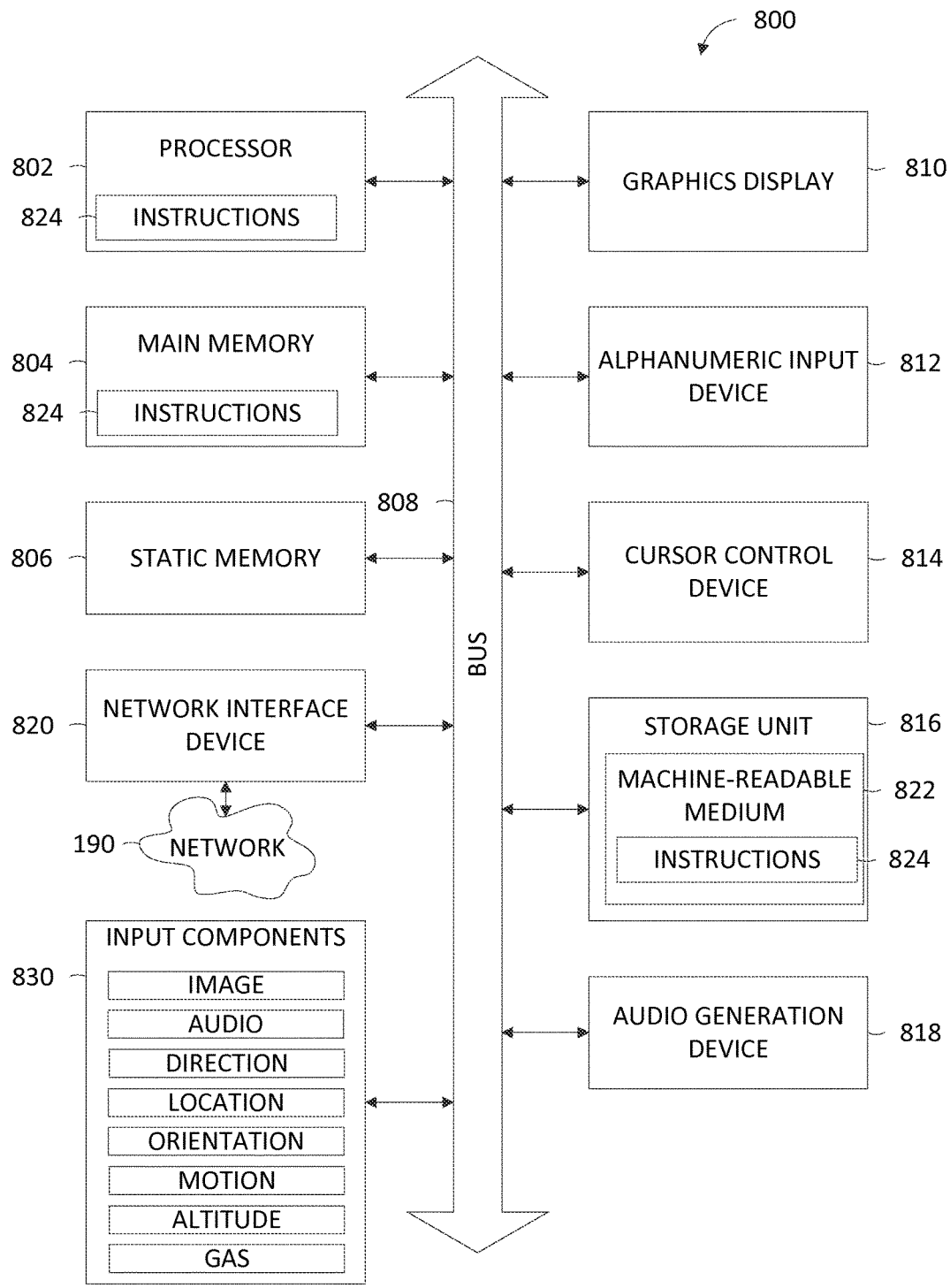
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system within which instructions 824 (e.g., software, a program, an application, an applet, an app, or other executable code) for causing the machine 800 to perform any one or more of the methodologies discussed herein may be executed. In alternative embodiments, the machine 800 operates as a stand-alone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but be not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 825, sequentially or otherwise, that specify actions to be taken by machine 800. Further, while only a single machine 800 is illustrated, the term "machine" shall also be taken to include a collection of machines 800 that individually or jointly execute the instructions 825 to perform any one or more of the methodologies discussed herein.

The machine 800 may include processors 810, memory 830, and I/O components 850, which may be configured to communicate with each other via a bus 805. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 815 and processor 820 that may execute instructions 825. The term "processor" is intended to include multi-core processor that may comprise two or more independent processors (also referred to as "cores") that may execute instructions contemporaneously. Although FIG. 8 shows multiple processors 810, the machine 800 may include a single processor with a single core, a single processor with multiple cores (e.g., a multi-core process), multiple processors with a single core, multiple processors with multiples cores, or any combination thereof.

The memory 830 may include a main memory 835, a static memory 840, and a storage unit 845 accessible to the processors 810 via the bus 805. The storage unit 845 may include a machine-readable medium 847 on which is stored the instructions 825 embodying any one or more of the methodologies or functions described herein. The instructions 825 may also reside, completely or at least partially, within the main memory 835, within the static memory 840, within at least one of the processors 810 (e.g., within the processor's cache memory), or any suitable combination thereof, during execution thereof by the machine 800. Accordingly, the main memory 835, static memory 840, and the processors 810 may be considered machine-readable media 847.

As used herein, the term "memory" refers to a machine-readable medium 847 able to store data temporarily or permanently and may be taken to include, but not be limited to, random-access memory (RAM), read-only memory (ROM), buffer memory, flash memory, and cache memory. While the machine-readable medium 847 is shown in an example embodiment to be a single medium, the term "machine-readable medium" should be taken to include a single medium or multiple media (e.g., a centralized or distributed database, or associated caches and servers) able to store instructions 825. The term "machine-readable medium" shall also be taken to include any medium, or combination of multiple media, that is capable of storing instructions (e.g., instructions 825) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 850 may include a wide variety of components to receive input, provide and/or produce output, transmit information, exchange information, capture measurements, and so on. It will be appreciated that the I/O components 850 may include many other components that are not shown in FIG. 8. In various example embodiments, the I/O components 850 may include output components 852 and/or input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 850 may include biometric components 856, motion components 858, environmental components 860, and/or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 862 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 and/or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine and/or any of a wide variety of peripheral devices (e.g., a peripheral device couple via a Universal Serial Bus (USB)).

Moreover, the communication components 864 may detect identifiers and/or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), acoustic detection components (e.g., microphones to identify tagged audio signals), and so on. In additional, a variety of information may be derived via the communication components 864 such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 825 may be transmitted and/or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 825 may be transmitted and/or received using a transmission medium via the coupling 872 (e.g., a peer-to-peer coupling) to devices 870. The term "transmission medium" shall be taken to include any intangible medium that is capable of storing, encoding, or carrying instructions 825 for execution by the machine 800, and includes digital or analog communications signals or other intangible medium to facilitate communication of such software.

Furthermore, the machine-readable medium 847 is non-transitory (in other words, not having any transitory signals) in that it does not embody a propagating signal. However, labeling the machine-readable medium 847 as "non-transitory" should not be construed to mean that the medium is incapable of movement; the medium should be considered as being transportable from one physical location to another. Additionally, since the machine-readable medium 847 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, from a requesting system via a network, a request for one or more numbers, wherein the request includes an original range of possible numbers;
    loading an original list of previously allocated numbers into an indexed data structure stored in a data store;
    generating, by at least one hardware processor, gap values for the original list of previously allocated numbers in the indexed data structure, each gap value representing a mathematical difference between one of the original list of previously allocated numbers and an index value in the indexed data structure corresponding to the one of the original list of previously allocated numbers;
    performing, by the at least one hardware processor, an available number search process on the original list of previously allocated numbers in the indexed data structure to identify one or more currently available numbers within the original range of possible numbers and using the original list of previously allocated numbers as an initial current number list, wherein each iteration of the available number search process includes, for a current number list:
        determining, using the at least one hardware processor, whether there are one or more available numbers between a lowest number in the current number list and a highest number in the current number list based on a comparison of the gap value associated with the highest number in the current number list to the gap value associated with the lowest number in the current number list, and in accordance with a determination that there are one or more available numbers between the lowest number in the current number list and the highest number in the current number list:

identifying one or more of the available numbers between the lowest number in the current number list and the highest number in the current number list; and transmitting, via the network, one or more of the identified available numbers to the requesting system.

2. The method of claim 1, further including:

in accordance with the determination that there are one or more available numbers between the lowest number in the current number list and the highest number in the current number list:

determining whether the current number list can be split into two sub-lists; and in accordance with a determination that the current number list can be split into two sub-lists:

dividing the current number list into a first sub-list and a second sub-list; and repeating the available number search process with the newly created first sub-list as the new current number list;

wherein the identifying of the one or more of the available numbers and the transmitting of at least one of the one or more of the available numbers are performed in accordance with a determination that the current number list cannot be split into two sub-lists.

3. The method of claim 2, wherein each iteration of the available number search process further includes determining the lowest number and the highest number in the current number list, wherein the highest number in the current number list is the previously allocated number with the highest numeric value in the current number list and the lowest number is the previously allocated number with the lowest numeric value in the current number list.

4. The method of claim 1, wherein determining whether there are one or more available numbers between the lowest number in the current number list and the highest number in the current number list based on a comparison of the gap value associated with the highest number in the current number list to the gap value associated with the lowest number in the current number list further includes:

comparing the gap value associated with the highest number in the current number list to the gap value associated with the lowest number in the current number list; and in accordance with a determination that the gap value associated with the highest number in the current number list and the gap value associated with the lowest number in the current number list are not equal, determining that the current number list has at least one available number.

5. The method of claim 2, further including, after dividing the current number list into the first sub-list and the second sub-list, storing the second sub-list in a number list stack.

6. The method of claim 5, further including, in accordance with a determination that there are no available numbers between the lowest number in the current number list and the highest number in the current number list:

identifying a next previously allocated number;

identifying a next sub-list in the number list stack that includes the identified next previously allocated number; and setting the identified next sub-list as the current number list and repeating the available number search process with the current number list.

7. The method of claim 6, wherein identifying the next previously allocated number further includes identifying an additional index value associated with the original list of previously allocated numbers having a value that is one greater than the index value associated with the highest number in the current number list.

8. The method of claim 1, wherein the original range of numbers includes a first minimum number and a first maximum number.

9. The method of claim 8, further including:

determining, based on the gap value associated with the lowest number in the original list of previously allocated numbers, whether there are one or more available numbers between the lowest number in the original list of previously allocated numbers and the first minimum number in the original range; and in accordance with a determination that there are one or more available numbers between the lowest number in the original list of previously allocated numbers and the first minimum number, allocating at least one of the one or more available numbers to be returned to the requesting system.

10. The method of claim 9, further including, in accordance with a determination that there are one or more available numbers between the lowest number in the current number list and the highest number in the current number list:

determining whether the one or more available numbers are sufficient to fulfill the request for one or more numbers; and in accordance with a determination that the one or more available numbers are not sufficient to fulfill the request for one or more numbers, continuing to perform the available number search process to identify additional available numbers in the original range of possible numbers.

11. The method of claim 1, wherein prior to loading one or more previously allocated numbers into the indexed data structure, retrieving the original list of previously allocated numbers that fall in the original range of possible numbers included with the request.

12. The method of claim 2, wherein dividing the current number list into the first sub-list and the second sub-list further includes:

dividing the current number list such that wherein a lowest number in the first sub-list is equal to the lowest number in the current number list, a highest number in the first sub-list is less than the highest number in the current number list, a lowest number in the second sub-list is higher than the highest number in the first sub-list, and a highest number in the second sub-list is equal to the highest number in the current number list.

13. The method of claim 1, further comprising adding the transmitted numbers to the original list of previously allocated numbers.

14. The method of claim 6, further including, in accordance with the determination that there are no available numbers between the lowest number in the current number list and the highest number in the current number list:

determining whether there is an additional index value associated with the original list of previously allocated numbers having a value that is one greater than the index value associated with the highest number in the current number list; and in accordance with a determination that there is no additional index value associated original list of previously allocated numbers with an index having a value that is one greater than the index value associated with the highest number in the current number list, determining whether there is at least one available number between the highest number in the current number list and the highest number in the original range of possible numbers.

15. A system comprising:

one or more processors; and a memory storing instructions that, when executed by the one or more processors, cause the system to perform operations comprising:

receiving, from a requesting system via a network, a request for one or more numbers, wherein the request includes an original range of possible numbers;

loading an original list of previously allocated numbers into an indexed data structure stored in a data store;

generating gap values for the original list of previously allocated numbers in the indexed data structure, each gap value representing a mathematical difference between one of the original list of previously allocated numbers and an index value in the indexed data structure corresponding to the one of the original list of previously allocated numbers;

performing an available number search process on the original list of previously allocated numbers in the indexed data structure to identify one or more currently available numbers within the original range of possible numbers and using the original list of previously allocated numbers as an initial current number list, wherein each iteration of the available number search process includes, for a current number list:

determining whether there are one or more available numbers between a lowest number in the current number list and a highest number in the current number list based on a comparison of the gap value associated with the highest number in the current number list to the gap value associated with the lowest number in the current number list; and in accordance with a determination that there are one or more available numbers between the lowest number in the current number list and the highest number in the current number list:

identifying one or more of the available numbers between the lowest number in the current number list and the highest number in the current number list; and transmitting, via the network, one or more of the identified available numbers to the requesting system.

16. The system of claim 15, further including operations comprising adding the transmitted numbers to the list of previously allocated numbers.

17. A non-transitory computer-readable storage medium storing instructions that, when executed by one or more processors of a machine, cause the machine to perform operations comprising:

receiving, from a requesting system via a network, a request for one or more numbers, wherein the request includes an original range of possible numbers;

loading an original list of previously allocated numbers into an indexed data structure stored in a data store;

generating gap values for the original list of previously allocated numbers in the indexed data structure, each gap value representing a mathematical difference between one of the original list of previously allocated numbers and an index value in the indexed data structure corresponding to the one of the original list of previously allocated numbers;

performing an available number search process on the original list of previously allocated numbers in the indexed data structure to identify one or more currently available numbers within the original range of possible numbers and using the original list of previously allocated numbers as an initial current number list, wherein each iteration of the available number search process includes, for a current number list:

determining whether there are one or more available numbers between a lowest number in the current number list and a highest number in the current number list based on a comparison of the gap value associated with the highest number in the current number list to the gap value associated with the lowest number in the current number list; and in accordance with a determination that there are one or more available numbers between the lowest number in the current number list and the highest number in the current number list:

identifying one or more of the available numbers between the lowest number in the current number list and the highest number in the current number list; and transmitting, via the network, one or more of the identified available numbers to the requesting system.

* * * * *